United States Patent
Takahashi et al.

(10) Patent No.: US 9,303,891 B2
(45) Date of Patent: Apr. 5, 2016

(54) AIR CONDITIONING VENTILATOR

(75) Inventors: Takashi Takahashi, Sakai (JP);
Tomohiro Yabu, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 1418 days.

(21) Appl. No.: 12/527,806

(22) PCT Filed: Feb. 19, 2008

(86) PCT No.: PCT/JP2008/052686
§ 371 (c)(1),
(2), (4) Date: Aug. 19, 2009

(87) PCT Pub. No.: WO2008/102741
PCT Pub. Date: Aug. 28, 2008

(65) Prior Publication Data
US 2010/0015906 A1    Jan. 21, 2010

(30) Foreign Application Priority Data
Feb. 23, 2007 (JP) .................................. 2007-044227

(51) Int. Cl.
F24F 11/00 (2006.01)
F24F 12/00 (2006.01)
F24F 7/06 (2006.01)

(52) U.S. Cl.
CPC ................. *F24F 12/006* (2013.01); *F24F 7/06* (2013.01); *F24F 11/0012* (2013.01); *F24F 2011/0013* (2013.01); *F24F 2012/007* (2013.01); *Y02B 30/563* (2013.01)

(58) Field of Classification Search
CPC ..................................................... F24F 13/00
USPC ......... 454/258, 233, 232, 236, 229, 228, 230; 62/419
See application file for complete search history.

(56) References Cited

U.S. PATENT DOCUMENTS

| 4,646,966 A | 3/1987 | Nussbaum |
| 6,089,464 A * | 7/2000 | Morgan ....................... 236/49.3 |

(Continued)

FOREIGN PATENT DOCUMENTS

| JP | 2-4141 U | 1/1990 |
| JP | 4-23943 U | 2/1992 |

(Continued)

OTHER PUBLICATIONS

Office Action of corresponding Japanese Application No. 2007-044227 dated Nov. 22, 2011.

(Continued)

*Primary Examiner* — Steven B McAllister
*Assistant Examiner* — Brittany Towns
(74) *Attorney, Agent, or Firm* — Global IP Counselors

(57) ABSTRACT

An air conditioning ventilator includes a ventilation unit, an air conditioning unit and a bypass channel. The ventilation unit has an air supply channel configured to supply air from an outdoor space to a target space, and an air supply fan configured to create a first airflow from the outdoor space to the target space within the air supply channel. The air conditioning unit has an intake channel configured to take in air from the target space, a temperature regulator configured to regulate the temperature of air that has passed through the intake channel, a discharge channel configured to discharge temperature-adjusted air that has been regulated by the temperature regulator to the target space, and an air-conditioning fan configured to create a second airflow from the intake channel to the discharge channel via the temperature regulator. The bypass channel bypassed the air supply channel and the discharge channel.

21 Claims, 9 Drawing Sheets

(56) References Cited

U.S. PATENT DOCUMENTS

| | | | | |
|---|---|---|---|---|
| 6,131,653 | A | * | 10/2000 | Larsson .................... 165/228 |
| 7,104,082 | B1 | * | 9/2006 | Moratalla ................. 62/271 |
| 7,185,510 | B2 | * | 3/2007 | Lee et al. ................. 62/419 |
| 7,231,967 | B2 | * | 6/2007 | Haglid .................... 165/231 |
| 2006/0199510 | A1 | * | 9/2006 | Choi et al. .............. 454/237 |
| 2006/0199511 | A1 | * | 9/2006 | Chung et al. ........... 454/237 |

FOREIGN PATENT DOCUMENTS

| | | | | |
|---|---|---|---|---|
| JP | 04-076327 | A | | 3/1992 |
| JP | 05157299 | A | * | 6/1993 |
| JP | 6-74486 | A | | 3/1994 |
| JP | 7-77347 | A | | 3/1995 |
| JP | 8-166143 | A | | 6/1996 |
| JP | 09-269141 | A | | 10/1997 |
| JP | 10-259938 | A | | 9/1998 |
| JP | 2000193282 | A | * | 7/2000 |
| JP | 2001205043 | A | * | 7/2001 |
| JP | 2002-005487 | A | | 1/2002 |
| JP | 2005-49024 | A | | 2/2005 |
| JP | 2005-147446 | A | | 6/2005 |
| JP | 2005-337634 | A | | 12/2005 |
| JP | 2006-002954 | A | | 1/2006 |
| JP | 2006-071225 | A | | 3/2006 |
| JP | 2006-308208 | A | | 11/2006 |
| JP | 2006-343019 | A | | 12/2006 |
| WO | 2007/138954 | A1 | | 12/2007 |

OTHER PUBLICATIONS

Office Action of the corresponding Australian Application No. 200818073 Dated May 25, 2010.
European Search Report of corresponding EP Application No. 08 71 1510.1 dated Aug. 20, 2014.

* cited by examiner

AIR CONDITIONING VENTILATOR

CROSS-REFERENCE TO RELATED APPLICATIONS

This U.S. National stage application claims priority under 35 U.S.C. §119(a) to Japanese Patent Application No. 2007-044227, filed in Japan on Feb. 23, 2007,the entire contents of which are hereby incorporated herein by reference.

TECHNICAL FIELD

The present invention relates to an air-conditioning ventilator for performing ventilation and air conditioning.

BACKGROUND ART

In conventional practice, known examples of ventilators include those that perform mechanical ventilation, having an air discharge fan for forcefully discharging air in an indoor space to an outdoor space, and an air supply fan for forcefully supplying air from the outdoor space into the indoor space. Among these ventilators there are those provided with a total heat exchanger, which performs heat exchange between the discharged air and the supplied air without mixing the two together. According to this type of ventilator, it is possible to suppress as much as possible the increase in air conditioning load due to taking non-temperature-adjusted outside air into the indoor space, while taking outside fresh air into the indoor space.

When used in cold regions, this type of ventilator has problems with freezing of devices or the like that are provided at positions where cold air passes through when outside air is taken in, because the outside air being taken in is cold.

As a countermeasure to this problem, in the ventilator disclosed in Japanese Laid-open Patent Application No. 2006-71225, for example, the air blowing rate is controlled such that the amount of discharged air after being temperature -adjusted in the indoor space is comparatively greater than the amount of cold air supplied from the outdoor space, and the aforementioned freezing problem is improved.

In the ventilator disclosed in Japanese Laid-open Patent Application No. 2006-2954, for example, part of the discharged air that has been temperature-adjusted in the indoor space is mixed with the supplied air in the vicinity of the intake port for outside cold air, raising the temperature of the supplied air and thereby improving the aforementioned problem.

SUMMARY OF THE INVENTION

Technical Problem

However, the ventilator disclosed in Japanese Laid-open Patent Application No. 2006-71225 has a problem in that in cases in which the outside air temperature is extremely low, outside air cannot be taken in even intermittently because the indoor space becomes cold and makes the user uncomfortable, even if temperature-adjusted air from the indoor space continues to be caused to pass through the total heat exchanger.

With the ventilator disclosed in Japanese Laid-open Patent Application No. 2006-2954, it is conceivable that in cases in which heat is sufficiently exchanged between the supplied air and discharged air in the total heat exchanger and heat recovery is completed, for example, the discharged air and the supplied air could have substantially the same temperature. In such cases, even with a configuration in which the discharged air from the indoor space is mixed in the vicinity of the outside air intake port, it is impossible to expect an effect of further increasing the temperature of the supplied air, and there is a risk that the indoor space will become cold and make the user uncomfortable.

The present invention was devised in view of the above circumstances, and it is an object of the invention to provide an air-conditioning ventilator whereby a supply of fresh air can be ensured through ventilation even in cold regions, and freezing of the ventilation unit due to a cold air supply can be prevented.

Solution to Problem

An air-conditioning ventilator according to a first aspect of the present invention is an air-conditioning ventilator for performing air conditioning and ventilation in a target space, the air-conditioning ventilator comprising a ventilation unit, an air-conditioning unit, and a bypass channel. The ventilation unit has an air supply channel for supplying air from an outdoor space to the target space, and an air supply fan for creating an airflow from the outdoor space to the target space within the air supply channel. The ventilation unit according to this aspect includes ventilation performed by, e.g., an air supply fan as a second type of ventilation for actively taking in air from the outdoor space, a total heat exchanger as mechanical ventilation for actively discharging air in the indoor space while actively taking in air from the outdoor space and the like. The air-conditioning unit has intake channels for sucking air from the target space, a temperature regulator for regulating the temperature of the air that has passed through the intake channel, a discharge channel for blowing the temperature-adjusted air whose temperature has been regulated by the temperature regulator out to the target space, and an air-conditioning fan for creating an airflow from the intake channel to the discharge channel via the temperature regulator. The bypass channel bypasses an air supply channel and a discharge channel.

According to this aspect, the air supply channel through which passes the temperature-adjusted air created by the air-conditioning unit and the air supply channel that takes in fresh air from the outdoor space are bypassed by the bypass channel. Therefore, the temperature-adjusted air can pass through the bypass channel and reach the air supply channel. Therefore, in cases in which a target space is ventilated in a cold region or another location having a low outside air temperature, even if cold air is taken into the air supply channels, the air can be warmed by mixing with the temperature-adjusted air.

By adjusting the amount of temperature-adjusted air supplied to the air supply channel, for example, the need for an electric heater or the like in the air supply channel can be eliminated and outside air can be prevented from being blown out remaining at a low temperature to the indoor space.

A supply of fresh air through ventilation can thereby be ensured even in cold regions, and freezing of the ventilation unit due to a cold air supply can be suppressed.

An air-conditioning ventilator according to a second aspect of the present invention is the air air-conditioning ventilator according to the first aspect of the present invention, wherein the ventilation unit further comprises an air discharge channel for discharging air in the target space to the outdoor space, an air discharge fan for creating an airflow from the target space to the outdoor space in the air discharge channel, and a heat exchanging unit for conducting heat exchange while suppressing mixing between the air passing through the air supply channel and the air passing through the air discharge channel. The bypass channel bypasses the discharge channel and a space in the air supply channel between the outdoor space and the heat exchanger.

Since a heat exchanging unit for conducting heat exchange while suppressing intermixing is also provided, when fresh air from the outdoor space is taken into the target space via the air supply channel, heat can be recovered from the air that was already present in the target space. Therefore, the cold air supplied to the target space through the air supply channel can be warmed. Furthermore, freezing of the heat exchanger by cold air from the outdoor space can be suppressed because the temperature-adjusted air in the discharge channel is supplied to the space in the air supply channel between the outdoor space and the heat exchanger and the cold air is warmed.

Heat can thereby be recovered from the air in the target space, and freezing of the heat exchanger can be suppressed.

An air-conditioning ventilator according to a third aspect of the present invention is the air-conditioning ventilator according to the first or second aspect, wherein the bypass channel has a bypass damper whose passage surface area can be varied.

The flow rate at which temperature-adjusted air passes through the bypass channel for supplying temperature-adjusted air of the discharge channel to the air supply channel can be varied by adjusting the degree of opening of the bypass damper.

The amount of temperature-adjusted air supplied to the air supply channel can thereby be adjusted.

An air-conditioning ventilator according to a fourth aspect of the present invention is the air-conditioning ventilator according to the second aspect of the present invention, wherein the bypass channel has a bypass damper whose passage surface area can be varied. The air-conditioning ventilator further comprises a target temperature detector, an outdoor temperature detector, and an opening/closing controller. The target temperature detector detects the temperature of the target space. The outdoor temperature detector detects the temperature of the outdoor space. The opening/closing controller performs a control for closing the bypass damper in cases in which the difference between the temperature detected by the target temperature detector and the temperature detected by the outdoor detector is less than a predetermined value.

The opening/closing controller according to this aspect can ascertain both the temperature of the target space through the target temperature detector and the outdoor temperature through the outdoor temperature detector. In cases in which the difference between these temperatures is less than a predetermined value, control for closing the bypass damper is performed, thereby avoiding situations in which heat is wasted along with the discharge of air from the target space. In other words, in cases in which the difference between these temperatures is less than a predetermined value, confluent air containing the temperature-adjusted air that has passed through the bypass channel and the air of the outdoor space that has passed through the air supply channel is sometimes higher in temperature than air being discharged from the target space through the air discharge channel. When the bypass damper is opened, the temperature-adjusted air that has passed through the bypass channel and the outside air that has passed through the air supply channel are caused to flow together, and heat exchange is conducted with the air passing through the air discharge channel from the target space even in such a case; the air being discharged to the outdoor space takes heat from the air being supplied to the target space, and heat is wasted. The occurrence of such situations is prevented by the opening/closing controller performing a control for opening and closing the bypass damper.

The supply of temperature-adjusted air through the bypass channel is thereby stopped, whereby it is possible to avoid instances wherein heat is lost to the outdoor space by the heat exchange of the heat exchanger.

An air-conditioning ventilator according to a fifth aspect of the present invention is the air-conditioning ventilator according to the second aspect, further comprising a discharged air temperature detector, a confluent air temperature detector, and a shutoff controller. The bypass channel has a bypass damper whose passage surface area can be varied. The discharged air temperature detector detects the temperature of a space in the air discharge channel extending from the target space to the heat exchanger. The confluent air temperature detector detects the temperature of a space in the air supply channel extending from the confluence portion connected with the bypass channel to the heat exchanger. The shutoff controller closes the bypass damper in cases in which the difference between the temperature detected by the discharged air temperature detector and the temperature detected by the confluent air temperature detector is less than a predetermined value.

Through the discharged air temperature detector, the shutoff controller can ascertain the temperature of the space in the air discharge channel extending from the target space to the heat exchanger, and through the confluent air temperature detector, the shutoff controller can ascertain the temperature of the space in the air supply channel extending from the confluence portion associated with the bypass channel to the heat exchanger. In cases in which the difference between these temperatures is less than a predetermined value, control for closing the bypass damper is performed, thereby avoiding situations in which heat is wasted along with the discharge of air from the target space. In other words, in cases in which the difference between these temperatures is less than a predetermined value, confluent air containing the temperature-adjusted air that has passed through the bypass channel and the air of the outdoor space that has passed through the air supply channel is sometimes higher in temperature than air being discharged from the target space through the air discharge channel. When the bypass damper is opened, the temperature-adjusted air that has passed through the bypass channel and the outside air that has passed through the air supply channel are caused to flow together, and heat exchange is conducted with the air passing through the air discharge channel from the target space even in such a case; the air being discharged to the outdoor space takes heat from the air being supplied to the target space, and heat is wasted. The occurrence of such situations is prevented by the shutoff controller performing a control for shutting off the bypass damper.

The supply of temperature-adjusted air through the bypass channel is thereby stopped, whereby it is possible to avoid instances wherein heat is lost to the outdoor space by the heat exchange of the heat exchanger.

An air-conditioning ventilator according to a sixth aspect of the present invention is the air-conditioning ventilator according to the second aspect, further comprising an air discharge damper, an discharged air temperature detector, a confluent air temperature detector, and an air discharge damper shutoff controller. The air discharge damper is provided to the air discharge channel, and the passage surface area of the damper can be varied. The discharged air temperature detector detects the temperature of a space in the air discharge channel extending from the target space to the heat exchanger. The confluent air temperature detector detects the temperature of a space in the air supply channels extending from the confluence portion associated with the bypass channel to the heat exchanger. The air discharge damper shutoff controller closes the air discharge damper in cases in which the difference between the temperature detected by the discharged air temperature detector and the temperature detected by the confluent air temperature detector is less than a predetermined value.

Through the discharged air temperature detector, the air discharge damper shutoff controller can ascertain the temperature of the space in the air discharge channel extending from the target space to the heat exchanger, and through the confluent air temperature detector, the air discharge damper shutoff controller can ascertain the temperature of the space in the air supply channel extending from the confluence portion associated with the bypass channel to the heat exchanger. In cases in which the difference between these temperatures is less than a predetermined value, control for closing the air discharge damper is performed, whereby the discharged airflow does not reach the heat exchanger; therefore, confluent air from the bypass channel in the air supply channel can be supplied into the indoor space without undergoing heat exchange in the heat exchanger. Therefore, in cases such as when, e.g., the temperature of the flow passing through the air discharge channel is lower than the temperature of the confluent flow passing through the air supply channel, situations in which heat is wasted along with the discharge of air from the target space can be avoided by closing the air discharge damper and stopping heat exchange between both flows in the heat exchanger. In other words, in cases in which the difference between these temperatures is less than a predetermined value, confluent air containing the temperature-adjusted air that has passed through the bypass channel and the air of the outdoor space that has passed through the air supply channel is sometimes higher in temperature than air being discharged from the target space through the air discharge channel. When the air discharge damper is opened and heat exchange is conducted between the air passing through the air discharge channel from the target space and the confluent air containing the temperature-adjusted air that has passed through the bypass channel and the outside air that has passed through the air supply channel even in such a case; the air being discharged to the outdoor space takes heat from the air being supplied to the target space, and heat is wasted. The occurrence of such situations is prevented by the air discharge damper shutoff controller performing a control for shutting off the air discharge damper.

The discharge of air through the air discharge channel from the target space is thereby stopped, whereby it is possible to avoid instances wherein heat is lost to the outdoor space by the heat exchange of the heat exchanger.

An air-conditioning ventilator according to a seventh aspect of the present invention is the air-conditioning ventilator according to the sixth aspect of the present invention, wherein the air discharge damper is provided in the air discharge channel in a space between the target space and the heat exchanger.

The discharge of air from the target space can be prevented from reaching the heat exchanger by closing the air discharge damper provided in the air discharge channel between the target space and the heat exchanger.

It is thereby possible to more effectively avoid instances wherein heat is lost to the outdoor space by the heat exchange of the heat exchanger.

An air-conditioning ventilator according to an eighth aspect of the present invention is the air-conditioning ventilator according to the second aspect of the present invention, further comprising a branching air discharge channel, a branching air discharge damper, a discharged air temperature detector, a confluent air temperature detector, and a branching air discharge damper opening controller. The branching air discharge channel connects upstream and downstream sides of the heat exchanger so as not to pass through the heat exchanger. The branching air discharge damper is provided to the branching air discharge channel, and the passage surface area of the damper can be varied. The discharged air temperature detector detects the temperature of a space in the air discharge channel extending from the target space to the heat exchanger. The confluent air temperature detector detects the temperature of a space in the air supply channel extending from the confluence portion joined with the bypass channel to the heat exchanger. The branching air discharge damper opening controller opens the branching air discharge damper in cases in which the difference between the temperature detected by the discharged air temperature detector and the temperature detected by the confluent air temperature detector is less than a predetermined value.

Through the discharged air temperature detector, the branching air discharge damper opening controller can ascertain the temperature of the space in the air discharge channel extending from the target space to the heat exchanger, and through the confluent air temperature detector, the branching air discharge damper opening controller can ascertain the temperature of the space in the air supply channel extending from the confluence portion connected with the bypass channel to the heat exchanger. In cases in which the difference between these temperatures is less than a predetermined value, control for opening the branching air discharge damper is performed, whereby the discharged airflow can be discharged without reaching the heat exchanger; therefore, confluent air from the bypass channel in the air supply channel can be supplied into the indoor space without undergoing heat exchange in the heat exchanger. Therefore, in cases such as when, e.g., the temperature of the flow passing through the air discharge channel is lower than the temperature of the confluent flow passing through the air supply channel, situations in which heat is wasted along with the discharge of air from the target space can be avoided by opening the branching air discharge damper and stopping heat exchange between both flows in the heat exchanger. In other words, in cases in which the difference between these temperatures is less than a predetermined value, confluent air containing the temperature-adjusted air that has passed through the bypass channel and the air of the outdoor space that has passed through the air supply channel is sometimes higher in temperature than air being discharged from the target space through the air discharge channel. When the branching air discharge damper is closed and heat exchange is conducted between the air passing through the air discharge channel from the target space and the confluent air containing the temperature-adjusted air that has passed through the bypass channel and the outside air that has passed through the air supply channel even in such a case; the air being discharged to the outdoor space takes heat from the air being supplied to the target space, and heat is wasted. The occurrence of such situations is prevented by the branching air discharge damper opening controller performing a control for opening the branching air discharge damper.

Ventilation is thereby made possible by discharging air from the target space without passing the air through the heat exchanger, and it is possible to avoid instances wherein heat is lost to the outdoor space by the heat exchange of the heat exchanger.

An air-conditioning ventilator according to a ninth aspect of the present invention is the air-conditioning ventilator according to the eighth aspect of the present invention, wherein the branching air discharge damper switches between a state in which an air discharge channel and the heat exchanger are connected, and a state in which an air discharge channel and the branching air discharge channel are connected.

It is possible to switch between a state in which the air discharge channel and the heat exchanger are connected and a state in which the air discharge channel and the branching air discharge channel are connected by switching the branching air discharge damper, and it is possible to prevent the discharge of air from the target space from reaching the heat exchanger by switching to a state in which the air discharge channel and the branching air discharge channel are connected.

It is thereby possible to more effectively avoid instances wherein heat is lost to the outdoor space by the heat exchange of the heat exchanger.

An air-conditioning ventilator according to a tenth aspect of the present invention is the air-conditioning ventilator according to the first or second aspect of the present invention, further comprising a positive pressure controller for performing flow rate control such that the bypass channel side has positive pressure with respect to the air supply channels.

According to this aspect, the positive pressure controller performs flow rate control such that the bypass channel side has positive pressure with respect to the air supply channel; i.e., so as to prevent air from flowing from the air supply channel toward the bypass channel. The targets of this control include the air supply fan and/or the air-conditioning fan, for example. Specifically, in order to create an airflow (a light draft) flowing to the air supply channel from the bypass channel, for example, the rotational speed of the air supply fan is increased and the airflow from the air supply channel to the bypass channel is prevented, or the rotational speed of the air-conditioning fan is increased and the airflow from the air supply channel to the bypass channel is prevented.

It is thereby possible to avoid instances wherein cold air flows through the bypass channel from the ventilation unit to the air-conditioning unit.

An air-conditioning ventilator according to an eleventh aspect of the present invention is the air-conditioning ventilator according to the second aspect of the present invention, further comprising a target temperature detector, an outdoor temperature detector, and an airflow rate reduction controller. The target temperature detector detects the temperature of the target space. The outdoor temperature detector detects the temperature of the outdoor space. The airflow rate reduction controller performs a control for reducing the air supply rate while ensuring that the bypass channel has positive pressure with respect to the air supply channel in cases in which the difference between the temperature detected by the target temperature detector and the temperature detected by the outdoor temperature detector is less than a predetermined value.

The positive pressure controller according to this aspect can ascertain the temperature of the target space and the outside temperature. In cases in which the difference between these temperatures is less than a predetermined value, a control is performed for ensuring that the bypass channel has positive pressure with respect to the air supply channel, thereby avoiding situations in which heat is lost along with the discharge of air from the target space. In other words, in cases in which the difference between these temperatures is less than a predetermined value, the confluent air containing the temperature-adjusted air that has passed through the bypass channel and the air of the outdoor space that has passed through the air supply channel is sometimes higher in temperature than air being discharged from the target space through the air discharge channel. When the temperature-adjusted air that has passed through the bypass channel and the outside air that has passed through the air supply channel are caused to flow together and heat exchange is conducted with the air passing through the air discharge channel from the target space even in such a case, the air being discharged to the outdoor space takes heat from the air being supplied to the target space, and heat is wasted. The airflow rate reduction controller performs a control for reducing the air supply rate while ensuring that the bypass channel has positive pressure with respect to the air supply channel, thereby preventing situations which would promote heat waste and also preventing airflow from the air supply channel toward the bypass channel.

It is thereby possible to avoid instances wherein heat is lost to the outdoor space by the heat exchange of the heat exchanger, and also to avoid instances wherein cold air flows through the bypass channel from the ventilation unit to the air-conditioning unit.

An air-conditioning ventilator according to a twelfth aspect of the present invention is the air-conditioning ventilator according to the second aspect of the present invention, further comprising a discharged air temperature detector, a confluent air temperature detector, and an airflow rate adjustment controller. The discharged air temperature detector detects the temperature of a space in the air discharge channel extending from the target space to the heat exchanger. The confluent air temperature detector detects the temperature of a space in the air supply channel extending from the confluence portion associated with the bypass channel to the heat exchanger. The airflow rate adjustment controller performs a control for reducing the air supply rate while ensuring that the bypass channel has positive pressure with respect to the air supply channel in cases in which the difference between the temperature detected by the discharged air temperature detector and the temperature detected by the confluent air temperature detector is less than a predetermined value.

Through the discharged air temperature detector, the airflow rate adjustment controller can ascertain the temperature of the space in the air discharge channel extending from the target space to the heat exchanger, and through the confluent air temperature detector, the airflow rate adjustment controller can ascertain the temperature of the space in the air supply channel extending from the confluence portion associated with the bypass channel to the heat exchanger. In cases in which the difference between these temperatures is less than a predetermined value, a control is performed for ensuring that the bypass channel has positive pressure with respect to the air supply channel, thereby avoiding situations in which heat is lost along with the discharge of air from the target space. In other words, in cases in which the difference between these temperatures is less than a predetermined value, the confluent air containing the temperature-adjusted air that has passed through the bypass channel and the air of the outdoor space that has passed through the air supply channel is sometimes higher in temperature than air being discharged from the target space through the air discharge channel. When the temperature-adjusted air that has passed through the bypass channel and the outside air that has passed through the air supply channel are caused to flow together and heat exchange is conducted with the air passing through the air discharge channel from the target space even in such a case, the air being discharged to the outdoor space takes heat from the air being supplied to the target space, and heat is wasted. The airflow rate adjustment controller performs a control for reducing the air supply rate while ensuring that the bypass channel has positive pressure with respect to the air supply channel, thereby preventing situations which would promote heat waste and also preventing airflow from the air supply channel toward the bypass channel.

It is thereby possible to avoid instances wherein heat is lost to the outdoor space by the heat exchange of the heat exchanger, and also to avoid instances wherein cold air flows through the bypass channel from the ventilation unit to the air-conditioning unit.

An air-conditioning ventilator according to a thirteenth aspect of the present invention is the air-conditioning ventilator according to any of the first through twelfth aspects of the present invention, further comprising an air supply detector and a startup controller. The air supply detector detects the startup of the air supply fan. The startup controller increases the amount of air flowing from the bypass channel to the air supply channel in cases in which the air supply detector has detected the startup of the air supply fan.

Since an air supply detector is provided, the operating state of the air supply fan can be perceived. The startup controller performs a control for increasing the amount of air flowing from the bypass channel to the air supply channel in cases in which the air supply detector has detected the startup of the air supply fan. Therefore, a greater amount of temperature-adjusted air is supplied to the air supply channel through the bypass channel when the air supply fan is started up.

A greater amount of temperature-adjusted air is thereby supplied to the air supply channel, whereby it is possible to reduce localized discomfort in the indoor space due to cold air from the outdoor space being taken into the indoor space during startup, even in a stage at which the target space has not been sufficiently warmed during startup.

An air-conditioning ventilator according to a fourteenth aspect of the present invention is the air-conditioning ventilator according to any of the first through twelfth aspects of the present invention, further comprising an air supply detector and an operation positive pressure controller. The air supply detector detects the operating state of the air supply fan. The operation positive pressure controller performs a control such that the flow rate of the air supply fan is greater than the flow rate of the air discharge fan in cases in which the air supply detector has detected the operation of the air supply fan.

Since an operation positive pressure controller is provided, the operating state of the air supply fan can be perceived. The operation positive pressure controller performs a control for increasing the flow rate of the air supply fan so as to be greater than the flow rate of the air discharge fan in cases in which the startup of the air supply fan has been detected. Therefore, the target space is maintained at a positive pressure with respect to the space around the target space.

A positive pressure in the target space is thereby maintained, whereby it is possible to reduce the inflow of waste discharged air into the target space from the space around the target space.

An air-conditioning ventilator according to a fifteenth aspect of the present invention is the air-conditioning ventilator according to any of the first through fourteenth aspects of the present invention, further comprising an airflow rate controller for controlling the flow rate of supplied air passing through the bypass channel from the air-conditioning unit toward the ventilation unit.

The airflow rate controller controls the flow rate of supplied air passing through the bypass channel from the air-conditioning unit toward the ventilation unit, and also controls the feed rate of temperature-adjusted air that has been adjusted by the temperature regulator of the air-conditioning unit, whereby the temperature can be adjusted when the temperature-adjusted air and outside air flow together in the air supply channel.

It is thereby possible to regulate the temperature of the air supplied from the ventilation unit to the indoor space.

An air-conditioning ventilator according to a sixteenth aspect of the present invention is the air-conditioning ventilator according to the fifteenth aspect of the present invention, further comprising an outdoor sensor having at least one of either an outdoor temperature detector for detecting the temperature of the outdoor space, and an outdoor humidity detector for detecting the humidity of the outdoor space. The airflow rate controller controls the flow rate of the supplied air in accordance with the value detected by the outdoor sensor.

The outdoor sensor is further provided herein, and the airflow rate controller performs flow rate control according to the value detected by the outdoor sensor.

It is thereby possible to reduce the effects that changes in the air temperature, humidity and the like of the outdoor space have on the indoor space.

An air-conditioning ventilator according to a seventeenth aspect of the present invention is the air-conditioning ventilator according to the sixteenth aspect of the present invention, further comprising an indoor sensor having at least one of either an indoor temperature detector for detecting the temperature of the indoor space, and an indoor humidity detector for detecting the humidity of the indoor space. The airflow rate controller controls the flow rate of the supplied air in accordance with the relationship between the value detected by the outdoor sensor and the value detected by the indoor sensor.

Not only is the outdoor sensor provided, but the indoor sensor is provided herein as well. The airflow rate controller controls the flow rate of the supplied air in accordance with the relationship between the value detected by the outdoor sensor and the value detected by the indoor sensor.

It is thereby possible to reduce the extent of the effects that changes in outside air temperature and humidity have on the indoor space.

An air-conditioning ventilator according to an eighteenth aspect of the present invention is the air-conditioning ventilator according to the fifteenth aspect of the present invention, further comprising an air supply port sensor. The air supply port sensor has at least one of either an air supply port temperature detector for detecting the temperature of a space in the air supply channel extending from the outdoor space to the confluence portion associated with the bypass channel, and an air supply port humidity detector for detecting the humidity of the space extending from the outdoor space to the confluence portion associated with the bypass channel. The airflow rate controller controls the flow rate of the supplied air in accordance with the value detected by the air supply port sensor.

The air supply port sensor is further provided herein. The airflow rate controller controls the flow rate of the supplied air in accordance with the value detected by the air supply port temperature detector or by the air supply port humidity detector. Therefore, it is possible to reduce the extent of the effects on the indoor space caused by changes in the temperature or humidity of outdoor air taken into the air supply channel.

It is thereby possible to perform a control for further reducing the extent of the effects on the indoor space, in accordance with changes in the temperature or humidity of outdoor air actually being supplied to the indoor space.

An air-conditioning ventilator according to a nineteenth aspect of the present invention is the air-conditioning ventilator according to the eighteenth aspect of the present invention, further comprising an outdoor sensor having at least one of either an outdoor temperature detector for detecting the outdoor temperature, and an air supply channel humidity detector for detecting the outdoor humidity. The airflow rate controller controls the flow rate of the supplied air in accordance with the relationship between the value detected by the air supply port sensor and the value detected by the outdoor sensor.

Not only is the air supply channel sensor provided, but the outdoor sensor is herein provided as well. The airflow rate controller controls the flow rate of supplied air in accordance with not only the value detected by the air supply port sensor, but with the relationship with the value detected by the outdoor sensor as well.

It is thereby possible to more precisely reduce the extent of the effects that changes in the outside temperature and humidity have on the indoor space.

An air-conditioning ventilator according to a twentieth aspect of the present invention is the air-conditioning ventilator according to the fifteenth aspect of the present invention, further comprising a confluence sensor. The confluence sensor has at least any one of a confluent temperature detector for detecting the temperature of a space in the air supply channel extending from the confluence portion associated with the bypass channel to the heat exchanger, and a confluence humidity detector for detecting the humidity of the space extending from the confluence portion associated with the bypass channel to the heat exchanger. The airflow rate controller controls the flow rate of the supplied air in accordance with the value detected by the confluence sensor.

A confluence sensor is further provided herein. The airflow rate controller controls the flow rate of the supplied air in accordance with the value detected by the confluent temperature detector or by the confluent humidity detector. Therefore, the airflow rate controller is capable of adjusting the flow rate of supplied air caused to be confluent in the air supply channel via the bypass channel, so as to reduce the extent of the effects on the indoor space.

It is thereby possible to perform a control for further reducing the extent of effects on the indoor space, in accordance with changes in the temperature or humidity of the outdoor space actually being supplied to the indoor space.

An air-conditioning ventilator according to a twenty-first aspect of the present invention is the air-conditioning ventilator according to the twentieth aspect of the present invention, further comprising an air supply port sensor. The air supply port sensor has at least one of either an air supply port temperature detector for detecting the temperature of a space in the air supply channel extending from the outdoor space to the confluence portion associated with the bypass channel, and an air supply port humidity detector for detecting the humidity of the space extending from the outdoor space to the confluence portion associated with the bypass channel. The airflow rate controller controls the flow rate of the supplied air in accordance with the relationship between the value detected by the confluence sensor and the value detected by the air supply port sensor.

An air supply port sensor is further provided herein. The airflow rate controller controls the flow rate of the supplied air in accordance with the value detected by the air supply port temperature detector or by the air supply port humidity detector. Therefore, the airflow rate controller is capable of adjusting the flow rate of supplied air caused to be confluent in the air supply channel via the bypass channel, so as to reduce the extent of the effects on the indoor space.

It is thereby possible to perform a control for further reducing the extent of effects on the indoor space, in accordance with changes in the temperature or humidity of the outside air actually being supplied to the indoor space.

An air-conditioning ventilator according to a twenty-second aspect of the present invention is the air-conditioning ventilator according to the second aspect of the present invention, further comprising an air supply port sensor, a discharge channel sensor, and a confluence calculator. The air supply fan has an air supply fan motor for adjusting the flow rate. The air supply port sensor has at least one of either an air supply port temperature detector for detecting the temperature of a space in the air supply channel extending from the outdoor space to the confluence portion associated with the bypass channel, and an air supply port humidity detector for detecting the humidity of the space extending from the outdoor space to the confluence portion associated with the bypass channel. The discharge channel sensor has at least one of either a discharge channel temperature detector for detecting the temperature of air passing through the discharge channel, and a discharge channel humidity detector for detecting the humidity of air passing through the discharge channel. The confluence calculator calculates either the temperature or humidity of air passing through the point of confluence between the air supply channel and the bypass channel, on the basis of the air supply port sensor, the discharge channel sensor, and the rotational speed of the air supply fan motor.

The confluence calculator herein is capable of calculating either the temperature or humidity of air passing through the point of confluence, by using each of the values of the air supply port sensor, the discharge channel sensor, and the rotational speed of the air supply fan motor.

It is thereby possible to eliminate the need to provide a sensor in a position where confluent air passes through.

An air-conditioning ventilator according to a twenty-third aspect of the present invention is the air-conditioning ventilator according to the second aspect of the present invention, comprising a setting receiver, an indoor discharge sensor, and a discharge controller. The bypass channel has a bypass damper whose passage surface area can be varied, and a bypass fan whose passage flow rate can be varied by a bypass fan motor. The air supply fan has an air supply fan motor capable of varying the passage flow rate of the air supply channel. The setting receiver receives input for at least one of either a set temperature or set humidity in the target space. The indoor discharge sensor has at least one of either an indoor discharge temperature detector for detecting the temperature of air passing through a discharge space in the air supply channel between the heat exchanger and the target space, and an indoor discharge humidity detector for detecting the humidity of air passing through the discharge space. The discharge controller adjusts at least any one of the degree of opening of the bypass damper, the rotational speed of the bypass fan motor, and the rotational speed of the air supply fan motor, such that the value detected by the indoor discharge sensor approaches the value detected by the indoor temperature-humidity sensor.

The discharge controller herein adjusts the structural components such that the value detected by the indoor discharge sensor approaches the set value received by the setting receiver. It is therefore possible to approach the quality of the air blown out from the air supply channel to the target space, and of the air blown out from the discharge channel to the target space.

It is thereby possible to effectively suppress any discomfort of users in the target space while taking in fresh air from the outdoor space.

Advantageous Effects of Invention

In the air-conditioning ventilator according to the first aspect, a supply of fresh air through ventilation can be ensured even in cold regions, and freezing of the ventilation unit due to a cold air supply can be suppressed.

In the air-conditioning ventilator according to the second aspect, heat can be recovered from the air in the target space, and freezing of the heat exchanger can be suppressed.

In the air-conditioning ventilator according to the third aspect, the amount of temperature-adjusted air supplied to the air supply channel can be adjusted.

In the air-conditioning ventilator according to the fourth aspect, the supply of temperature-adjusted air through the bypass channel is stopped, whereby it is possible to avoid instances wherein heat is lost to the outdoor space by the heat exchange of the heat exchanger.

In the air-conditioning ventilator according to the fifth aspect, the supply of temperature-adjusted air through the bypass channel is stopped, whereby it is possible to avoid instances wherein heat is lost to the outdoor space by the heat exchange of the heat exchanger.

In the air-conditioning ventilator according to the sixth aspect, the discharge of air through the air discharge channel from the target space is stopped, whereby it is possible to avoid instances wherein heat is lost to the outdoor space by the heat exchange of the heat exchanger.

In the air-conditioning ventilator according to the seventh aspect, it is possible to more effectively avoid instances wherein heat is lost to the outdoor space by the heat exchange of the heat exchanger.

In the air-conditioning ventilator according to the eighth aspect, ventilation is made possible by discharging air from the target space without passing the air through the heat exchanger, and it is possible to avoid instances wherein heat is lost to the outdoor space by the heat exchange of the heat exchanger.

In the air-conditioning ventilator according to the ninth aspect, it is possible to more effectively avoid instances wherein heat is lost to the outdoor space by the heat exchange of the heat exchanger.

In the air-conditioning ventilator according to the tenth aspect, it is possible to avoid instances wherein cold air flows through the bypass channel from the ventilation unit to the air-conditioning unit.

In the air-conditioning ventilator according to the eleventh aspect, it is possible to avoid instances wherein heat is lost to the outdoor space by the heat exchange of the heat exchanger, and also to avoid instances wherein cold air flows through the bypass channel from the ventilation unit to the air-conditioning unit.

In the air-conditioning ventilator according to the twelfth aspect, it is possible to avoid instances wherein heat is lost to the outdoor space by the heat exchange of the heat exchanger, and also to avoid instances wherein cold air flows through the bypass channel from the ventilation unit to the air-conditioning unit.

In the air-conditioning ventilator according to the thirteenth aspect, a greater amount of temperature-adjusted air is supplied to the air supply channel, whereby it is possible to reduce localized discomfort in the indoor space due to cold air from the outdoor space being taken into the indoor space during startup, even in a stage at which the target space has not been sufficiently warmed during startup.

In the air-conditioning ventilator according to the fourteenth aspect, a positive pressure in the target space is maintained, whereby it is possible to reduce the inflow of waste discharged air into the target space from the space around the target space.

In the air-conditioning ventilator according to the fifteenth aspect, it is possible to regulate the temperature of the air supplied from the ventilation unit to the indoor space.

In the air-conditioning ventilator according to the sixteenth aspect, it is possible to reduce the effects that changes in the air temperature, humidity, and the like of the outdoor space have on the indoor space.

In the air-conditioning ventilator according to the seventeenth aspect, it is possible to reduce the extent of the effects that changes in outside air temperature and humidity have on the indoor space.

In the air-conditioning ventilator according to the eighteenth aspect, it is possible to perform a control for further reducing the extent of the effects on the indoor space, in accordance with changes in the temperature or humidity of outside air actually being supplied to the indoor space.

In the air-conditioning ventilator according to the nineteenth aspect, it is possible to more precisely reduce the extent of the effects that changes in outside air temperature and humidity have on the indoor space.

In the air-conditioning ventilator according to the twentieth aspect, it is possible to perform a control for further reducing the extent of effects on the indoor space, in accordance with changes in the temperature or humidity of the outside air actually being supplied to the indoor space.

In the air-conditioning ventilator according to the twenty-first aspect, it is possible to perform a control for further reducing the extent of effects on the indoor space, in accordance with changes in the temperature or humidity of the outside air actually being supplied to the indoor space.

In the air-conditioning ventilator according to the twenty-second aspect, it is possible to eliminate the need to provide a sensor in a position where confluent air passes through.

In the air-conditioning ventilator according to the twenty-third aspect, it is possible to effectively suppress any discomfort of users in the target space while taking in outside fresh air.

DETAILED DESCRIPTION OF THE INVENTION

The following is a description, made with reference to the accompanying drawings, of an embodiment of an air-conditioning ventilator 1 of the present invention equipped with a ventilation unit and an air-conditioning apparatus.

(1) Configuration of Air-Conditioning Apparatus

Figure 1:
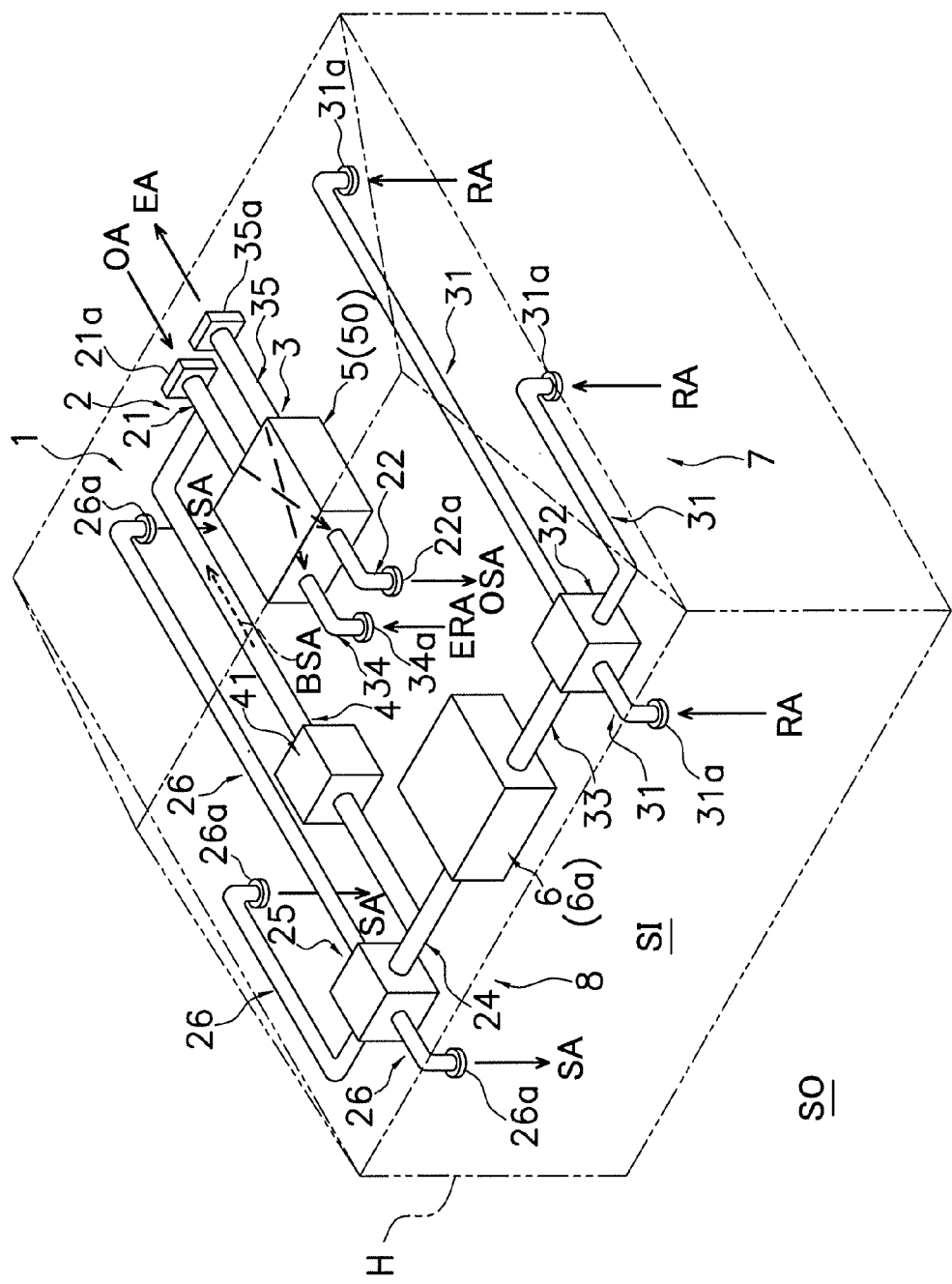
FIG. 1 is a schematic structural drawing of a building in which the air-conditioning ventilator according to an embodiment of the present invention is used.
Figure 2:
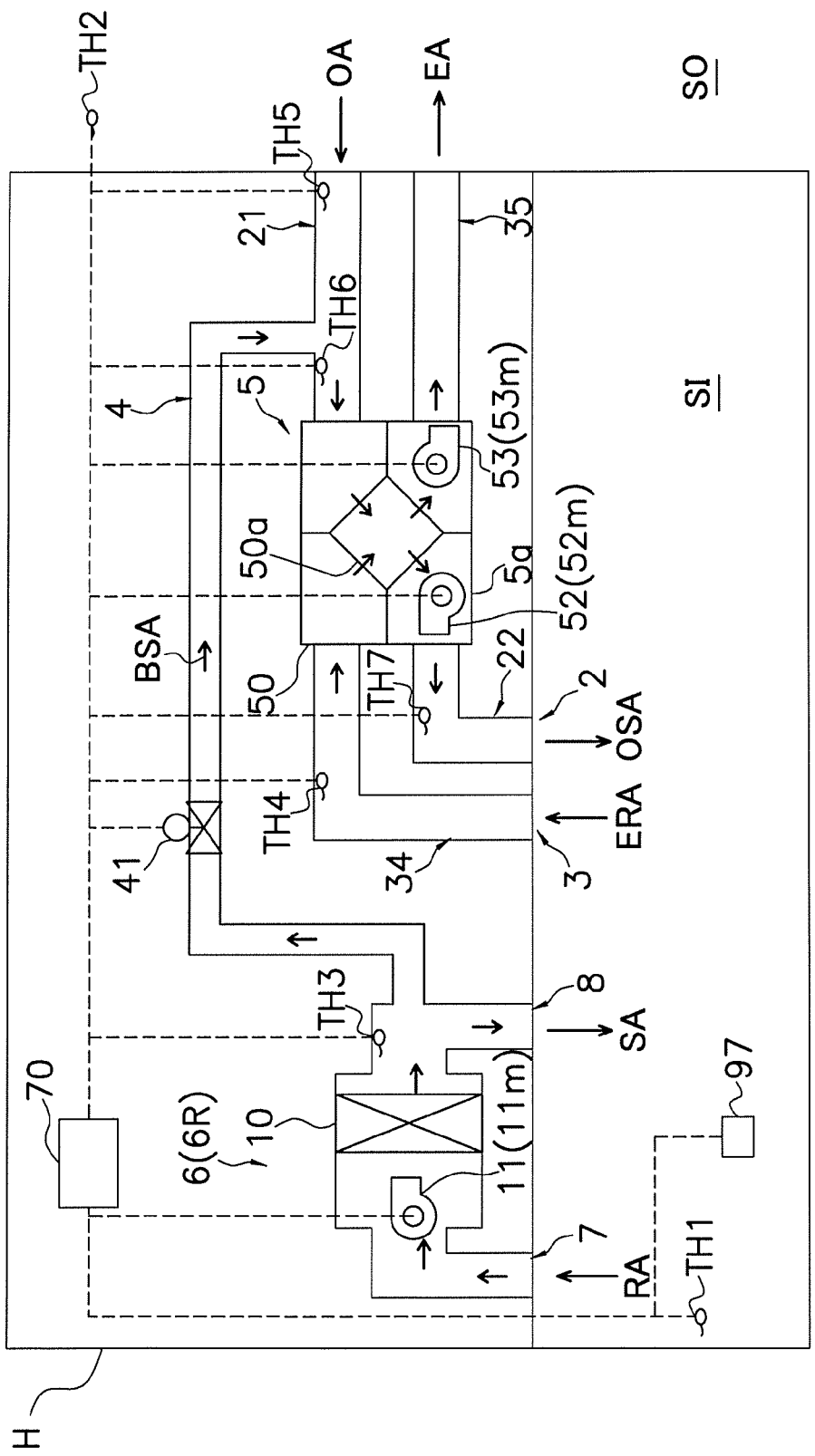
FIG. 2 is an explanatory diagram showing the flow of air in the air-conditioning ventilator.

FIG. 1 is an external perspective view of the air-conditioning ventilator 1 according to an embodiment of the present invention, and FIG. 2 is a schematic structural drawing of the air-conditioning ventilator according to the first embodiment of the present invention. The air-conditioning ventilator 1 is disposed in the ceiling in a room of a building H, and is a system for performing air-conditioning operations while ventilating the room. The air-conditioning ventilator 1 comprises a ventilation unit 5, an air-conditioning unit 6, a bypass duct 4 for connecting these units, various sensors, a control device 70, and a remote controller 97.

<Ventilation Unit>

The ventilation unit 5 comprises an air supply duct 2, an air discharge duct 3, and a total heat exchanger 50, as shown in FIGS. 1 and 2.

The air supply duct 2 is a duct for connecting the outdoor space and the indoor space in order to supply air from the outdoor space SO to the indoor space SI, and is configured primarily by an inlet duct 21 and an indoor air supply duct 22. One end of the inlet duct 21 is an air inlet 21a connected to an opening in the wall of the building H in order to introduce air in from the outdoor space SO, and the other end is connected to an air supply-side inlet of the total heat exchanger 50 (described hereinafter). One end of the indoor air supply duct 22 is connected to an air supply-side outlet of the total heat exchanger 50, and the other end is an air outlet 22a connected to an opening in the ceiling surface of the indoor space SI.

The air discharge duct, or air exhaust channel, 3 is a duct for connecting the outdoor space and the indoor space in order to lead air out from the indoor space SI to the outdoor space SO, and is configured by an indoor air discharge duct 34 and an outlet duct 35. One end of the indoor air discharge duct 34 is an air inlet 34a connected to an opening in the ceiling surface of the indoor space SI, and the other end is connected to an air exhaust-side inlet of the total heat exchanger 50. One end of the outlet duct 35 is connected to an air exhaust-side outlet of the total heat exchanger 50, and the other end is an air outlet 35a connected to an opening in a wall surface of the building H in order to lead air out tote outdoor space.

The total heat exchanger 50 has a casing 5a, an air supply fan 52, and an air discharge fan 53, and a heat exchanger element 50a.

Formed in the casing 5a are an air supply-side inlet to which the inlet duct 21 is connected, an air-supplying outlet to which the indoor air supply duct 22 is connected, an air-discharging inlet to which the indoor air discharge duct 34 is connected, and an air discharge-side outlet to which the outlet duct 35 is connected. The air supply fan 52, being disposed on the indoor air supply duct 22 side of the heat exchanger element 50a, is a device for sucking air from the outdoor space SO into the casing 5a via the inlet duct 21 and blowing the air out to the indoor air supply duct 22, and is driven by an air supply fan motor 52m. The air discharge fan 53, being disposed on the outlet duct side of the heat exchanger element 50a, is a device for sucking air from the indoor space SI into the casing 5a via the indoor air discharge duct 34 and blowing the air out to the outlet duct 35, and is driven by an air discharge fan motor 53m. The disposition of the air supply fan 52 and the air discharge fan 53 is not limited to this option alone, and the air supply fan 52 may be disposed in the inlet duct 21 side of the heat exchanger element 50a, for example, while the air discharge fan 53 is disposed in the indoor air discharge duct 34 side of the heat exchanger element 50a.

The heat exchanger element 50a can perform heat exchange while preventing intermixing between fresh air sucked in from the outdoor space SO via the air supply duct 2 (specifically, the inlet duct 21) by the air supply fan 52, and air sucked in from the indoor space SI via the air discharge duct 3 (specifically, the indoor air discharge duct 34) by the air discharge fan 53. Cold, fresh air from the outdoor space SO is warmed through heat recovery from warm indoor space SI air by performing heat exchange, creating a state of increased temperature, and the air is supplied to the indoor space SI via the air supply duct 2 (specifically, the indoor air supply duct 22). The air from the indoor space SI that has undergone heat exchange is led out to the outdoor space SO via the air discharge duct 3 (specifically, the outlet duct 35). The discomfort in the indoor space SI caused by taking in cold air directly from the outdoor space SO can thereby be reduced, and the freshness of the air in the indoor space SI can be improved.

The temperature-adjusted air BSA passing through the bypass duct 4 is supplied to the space in the inlet duct 21 joining the outdoor space SO and the heat exchanger element 50a, thereby warming the cold air from the outdoor space SO, and it is therefore possible to avoid instances wherein the heat exchanger element 50a or other components freeze due to the cold air from the outdoor space SO.

<Air-Conditioning Unit>

The air-conditioning unit 6 comprises an indoor unit 6a and an outdoor unit (not shown).

Heat exchangers are housed in both the indoor unit 6a and the outdoor unit (not shown), and the heat exchangers are connected by refrigerant pipes (not shown), thereby constituting a refrigerant circuit. The refrigerant circuit is configured primarily from an indoor heat exchanger 10, an accumulator (not shown), a compressor, a four-way switching valve, an outdoor heat exchanger, an expansion valve, and other components. It is possible to switch between a cooling operation, a heating operation, and other operations by switching the connection state using the four-way switching valve.

The indoor unit 6a specifically comprises an intake duct 7, a discharge duct 8, a casing 6a, an indoor heat exchanger 10, an indoor fan 11 driven by an indoor fan motor 11m, and other components.

The intake duct 7 has a plurality (three in the present embodiment) of intake branching ducts 31, an intake branching unit 32, and an intake confluence duct 33. One end of each of the three intake branching ducts 31 is an air inlet 31a connected to an opening in the ceiling surface of the indoor space SI, and the other ends are connected to second, third, and fourth ports of the four ports of the intake branching unit 32. The intake branching unit 32 is a substantially rectangular-parallelepiped-shaped hollow box in the present embodiment, having four ports. Among these four ports, the intake confluence duct 33 is connected to the first port, and the three intake branching ducts 31 are connected to the other three ports (i.e., the second, third, and fourth ports) as described above. One end of the intake confluence duct 33 is connected to the first port of the intake branching unit 32, and the other end is connected to the intake side of the indoor heat exchanger 10.

The discharge duct 8 has a plurality (three in the present embodiment) of discharge branching ducts 26, a discharge confluence duct 24, and a discharge branching unit 25. One end of the discharge confluence duct 24 is connected to a first port of the discharge branching unit 25, and the other end is connected to the discharge side of the indoor heat exchanger 10. The discharge branching unit 25 is a substantially rectangular-parallelepiped-shaped hollow box in the present embodiment, having four ports. Among these four ports, the discharge confluence duct 24 is connected to the first port as described above, and the three discharge branching ducts 26 are connected to the other three ports (i.e., the second, third, and fourth ports). One end of each of the three air supply-side branching ducts 26 is respectively connected to any of the second, third, and fourth ports of the discharge branching unit 25, and the other ends are air supply ports 26a connected to openings in the ceiling surface of the room or the like in which indoor air conditioning is performed.

Formed in the casing 6a are an inlet to which the intake confluence duct 33 is connected, and an outlet to which the discharge confluence duct 24 is connected.

A refrigerant is supplied from the outdoor unit (not shown) to the indoor heat exchanger 10, and the air can be cooled or heated by performing heat exchange between the refrigerant and the air sucked into the casing 6a by the indoor fan 11.

The indoor fan 11 is driven by an indoor fan motor 11m. Driving the indoor fan 11 causes air in the indoor space SI to be sucked through the intake branching ducts 31 into the casing 6a via the intake confluence duct 33 from the inlet formed in the casing 6a. The air then undergoes heat exchange through the indoor heat exchanger 10 to be adjusted in terms of its temperature, and the resulting air can be blown back out to the indoor space SI through the discharge branching ducts 26, via the outlet formed in the casing 6a and via the discharge confluence duct 24.

Thus, in the present embodiment, the air-conditioning unit 6 can perform air conditioning in a room being targeted to be ventilated by the ventilation unit 5.

<Bypass Duct>

The bypass duct 4 is a duct for connecting together the discharge confluence duct 24 of the discharge duct 8 in the air-conditioning unit 6, and the inlet duct 21 of the air supply duct 2 in the ventilation unit 5, as shown in FIG. 1 or 2.

One end of the bypass duct 4 extends so as to branch away from the discharge confluence duct 24, and the other end is connected so as to be confluent with the inlet duct 21.

The bypass duct 4 comprises a bypass damper 41 capable of adjusting the flow rate between a portion branching from the discharge confluence duct 24 and a portion confluent with the inlet duct 21. By opening and closing, the bypass damper 41 can adjust the flow rate of the temperature-adjusted air BSA flowing through the bypass duct 4 from the discharge confluence duct 24 to the inlet duct 21.

<Various Sensors>

An indoor temperature-humidity sensor TH1 for detecting the indoor temperature and humidity is provided in the indoor space SI, as shown in FIG. 2. An outdoor temperature-humidity sensor TH2 for detecting the outside temperature and humidity is provided in the outdoor space SO. Furthermore, a temperature-adjusted air temperature-humidity sensor TH3 for detecting the temperature and humidity of air that has passed through the indoor heat exchanger 10 is provided to the air-conditioning unit 6. An air discharge temperature-humidity sensor TH4 for detecting the temperature and humidity of air that has passed through the indoor air discharge duct 34 is provided to the indoor air discharge duct 34. In the inlet duct 21, an outside air intake temperature-humidity sensor TH5 is provided for detecting the temperature and humidity of air passing nearer to the outdoor space SO than to the portion confluent with the bypass duct 4. Also provided in the inlet duct 21 is a confluent air temperature-humidity sensor TH6 for detecting the temperature and humidity of air passing nearer to the heat exchanger element 50a than to the portion confluent with the bypass duct 4. The indoor air supply duct 22 is provided with an indoor discharge temperature-humidity sensor TH7 for detecting the temperature and humidity of air passing through the indoor air supply duct 22.

<Control Device>

Figure 3:
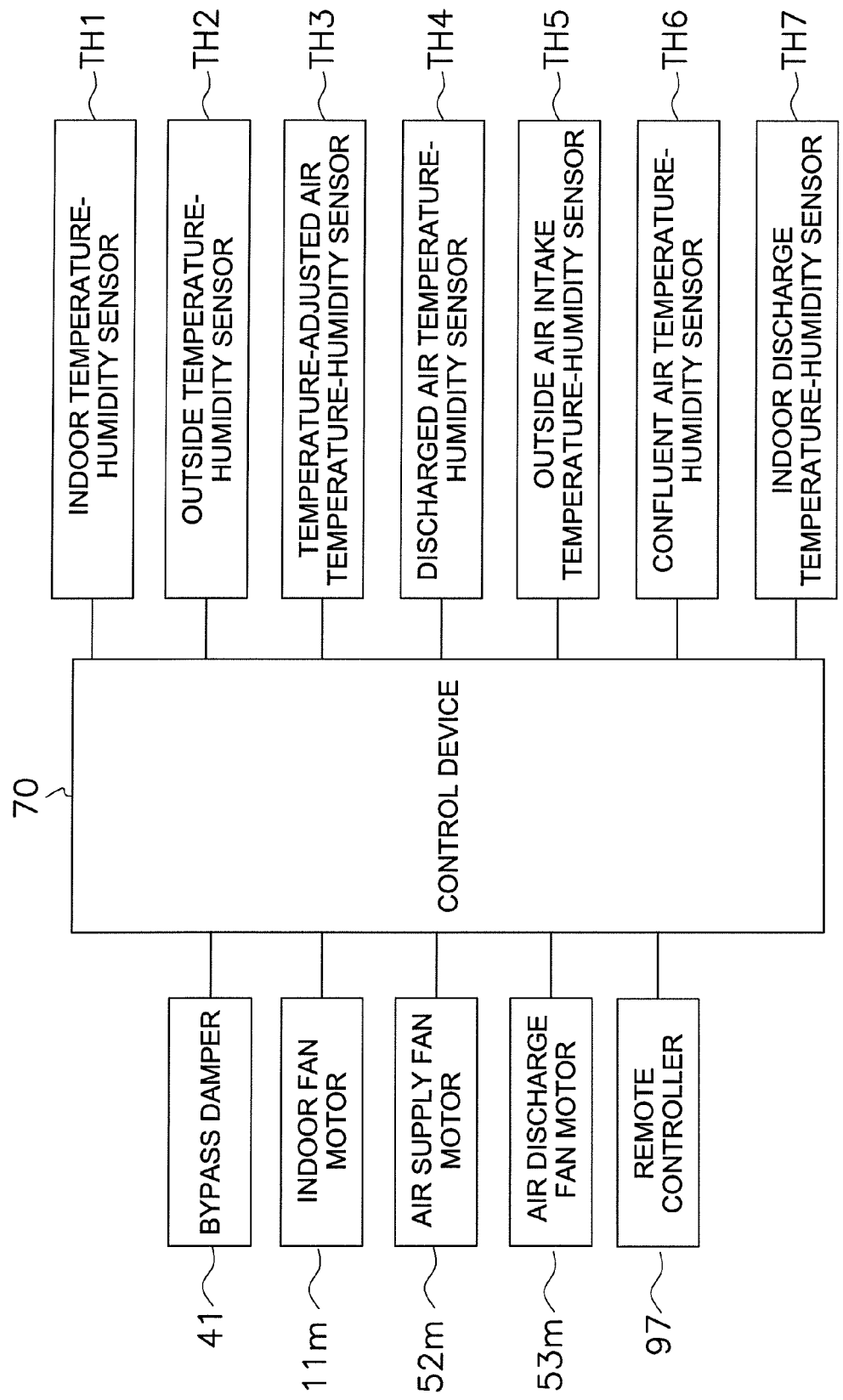
FIG. 3 is a block structural diagram pertaining to a control device.

The control device 70 is composed of a CPU, ROM, RAM, and other components (not shown); and the control device 70 is respectively connected via communication wires to the indoor fan motor 11m, the air supply fan motor 52m, the air discharge fan motor 53m, the bypass damper 41, the remote controller 97, the indoor temperature-humidity sensor TH1, the outdoor temperature-humidity sensor TH2, the temperature-adjusted air temperature-humidity sensor TH3, the air discharge temperature-humidity sensor TH4, the outside air intake temperature-humidity sensor TH5, the confluent air temperature-humidity sensor TH6, and the indoor discharge temperature-humidity sensor TH7, as shown in the control block diagram in FIG. 3.

Based on signals from the remote controller 97, the control device 70 collects values detected in the various sensors (the indoor temperature-humidity sensor TH1, the outdoor temperature-humidity sensor TH2, the temperature-adjusted air temperature-humidity sensor TH3, the air discharge temperature-humidity sensor TH4, the outside air intake temperature-humidity sensor TH5, the confluent air temperature-humidity sensor TH6, and the indoor discharge temperature-humidity sensor TH7), and controls the rotational speeds of the indoor fan motor 11m, the air supply fan motor 52m, and the air discharge fan motor 53m respectively.

The control device 70 adjusts the flow rate of temperature-adjusted air BSA passing through the bypass duct 4 by controlling the rotational speeds of the indoor fan motor 11m and the air supply fan motor 52m respectively.

The remote controller 97 is capable of giving operation instructions and the like to the ventilation unit 5 and the air-conditioning unit 6, and is connected to the control device 70 as described above.

<Controls Performed by Control Device>

The control device 70 performs control during startup, positive pressure maintenance control during operations, air supply temperature adjustment control, waste heat prevention control, and other various controls. The controls are described hereinbelow.

(Control During Startup)

The control device 70 is connected with the air supply fan motor 52m via a communication wire as described above, and the control device 70 can perceive the startup state of the air supply fan motor 52m. When the air supply fan motor 52m is initially driven, the control device 70 performs control during startup for controlling the rotational speeds of the air supply fan motor 52m and the indoor fan motor 11m so as to increase the flow rate of temperature-adjusted air BSA flowing from the bypass duct 4 to the inlet duct 21. If resolvable, another option is to control the rotational speed of either the air supply fan motor 52m or the indoor fan motor 11m alone.

Since the control during startup is thus performed when the air supply fan motor 52m begins to be driven, a greater amount of temperature-adjusted air BSA is supplied to the inlet duct 21 through the bypass duct 4 when the air supply fan motor 52m starts up. Therefore, when the ventilation unit 5 starts up, a greater amount of temperature-adjusted air BSA is supplied to the inlet duct 21 even if the indoor space SI has not been sufficiently warmed by the operation of the air-conditioning unit 6. It is thereby possible to reduce any localized discomfort in the vicinity of the ceiling opening of the indoor air supply duct 22 in the indoor space SI, caused by cold air from the outdoor space SO being taken into the indoor space SI during startup.

For example, a case is considered in which the temperature of the room air RA as detected by the indoor temperature-humidity sensor TH1 is 15° C., the temperature of the temperature-adjusted air BSA of the discharge duct 8 generated by the air-conditioning unit 6 is 25° C., and the temperature detected by the outdoor temperature-humidity sensor TH2 is −20° C. In such cases, the temperature of the air (ERA) discharged from the indoor space SI through the indoor air discharge duct 34 is substantially the same as the temperature detected by the indoor temperature-humidity sensor TH1, which is 15° C. The temperature of the air (RA) taken into the air-conditioning unit 6 through the intake duct 7 is also substantially the same as the temperature detected by the indoor temperature-humidity sensor TH1, and the temperature of the air (SA) blown out to the indoor space SI from the discharge duct 8 is 25° C., which is the temperature of the temperature-adjusted air BSA. Furthermore, the temperature of the temperature-adjusted air BSA passing through the bypass duct 4 is also 25° C. In a state such as is described above, the air of −20° C. taken into the inlet duct 21 from the outdoor space SO mixes with the temperature-adjusted air BSA of 25° C. supplied through the bypass duct 4, and the temperature of the mixed confluent air is a temperature that corresponds to the flow rate in the bypass duct 4 and the rotational speed of the air supply fan motor 52m. In cases in which the temperature of the confluent air has been adjusted to 5° C., for example, the temperature of the air passing through the heat exchanger element 50a from the inlet duct 21 side is 5° C. Therefore, heat exchange is conducted between the confluent air of 5° C. and the air of 15° C. passing through the heat exchanger element 50a through the indoor air discharge duct 34 from the indoor space SI, and the confluent air recovers heat from the air from the indoor space SI. The air blown out to the indoor space SI through the indoor air supply duct 22 is thereby warmed to 8° C. On the other hand, the air led out to the outdoor space through the outlet duct 35 reaches 11° C. due to the heat recovery. In the manner described above, freezing of the heat exchanger element 50a is avoided during startup, and the temperature of the air supplied to the indoor space SI is adjusted.

(Positive Pressure Maintenance Control During Operations)

The control device 70 can perceive the operating state of the air supply fan motor 52m. In cases in which the operation of the air supply fan motor 52m has been detected, the control device 70 performs positive pressure maintenance control during operations, wherein the rotational speed of the air supply fan motor 52m (the flow rate of the air supply fan 52) is increased to be greater than the rotational speed of the air discharge fan motor 53m (the flow rate of the air discharge fan).

Therefore, the space in the indoor space SI is maintained at a positive pressure with respect to the space surrounding the indoor space SI. A positive pressure in the target space is thereby maintained, whereby it is possible to reduce the inflow of waste discharged air into the target space from the space around the target space.

(Air Supply Temperature Adjustment Control)

The control device 70 performs air supply temperature control for adjusting the rotational speeds of the air supply fan motor 52m and the indoor fan motor 11m, controlling the flow rate of supplied air passing from the air-conditioning unit 6 toward the ventilation unit 5 through the bypass duct 4, and controlling the feed rate of temperature-adjusted air BSA that has been temperature-adjusted by the indoor heat exchanger 10 of the air-conditioning unit 6.

It is therefore possible to regulate the temperature of the confluent air in which the temperature-adjusted air BSA and the outside air have flowed together in the inlet duct 21 of the air supply duct 2. It is thereby possible to regulate the temperature of the air supplied from the ventilation unit 5 to the indoor space SI.

In cases in which a set temperature and humidity have been inputted from the remote controller 97, the control device 70 performs air supply temperature control in which the rotational speed of the indoor fan motor 11m and the rotational speed of the air supply fan motor 52m are adjusted based on the values detected by the various sensors TH1 through TH7, such that the indoor space SI approaches the set temperature and humidity.

In accordance with the values detected by the outside air intake temperature-humidity sensor TH5, the confluent air temperature-humidity sensor TH6, the indoor discharge temperature-humidity sensor TH7, and the outdoor temperature-humidity sensor TH2, which are disposed in proximity to the inlet of the inlet duct 21 in the air discharge duct 3; the control device 70 controls the rotational speeds of the air supply fan motor 52m and the indoor fan motor 11m so as to reduce the extent of the effect that changes in the air temperature, humidity, and other characteristics of the outdoor space SO have on the indoor space SI.

(Waste Heat Prevention Control)

The control device 70 performs waste heat prevention control for closing the bypass damper 41 in cases in which the difference between the inside temperature detected by the indoor temperature-humidity sensor TH1 and the temperature detected by the outdoor temperature-humidity sensor TH2 is less than a predetermined value; i.e., in cases in which the confluent air temperature detected by the confluent air temperature-humidity sensor TH6 is higher than the inside temperature detected by the indoor temperature-humidity sensor TH1.

Performing waste heat prevention control makes it possible to avoid instances wherein heat is wasted along with the discharge of air from the indoor space SI. Specifically, in cases in which the difference between the inside temperature and the outside temperature is less than a predetermined value, the confluent air containing the temperature-adjusted air BSA that has passed through the bypass duct 4 and the air of the outdoor space SO that has passed through the inlet duct 21 is sometimes higher in temperature than inside air being discharged from the indoor space SI through the air discharge duct 3. When the bypass damper 41 is opened, the temperature-adjusted air BSA that has passed through the bypass duct 4 and the outside air that has passed through the inlet duct 21 flow together, and heat exchange is conducted with the air passing through the air discharge duct 3 from the indoor space SI even in such a case; the air being discharged to the outdoor space SO takes heat from the air being supplied to the indoor space SI, and heat is wasted.

The occurrence of such situations can be prevented by performing a control for closing the bypass damper 41 during waste heat prevention control. The supply of temperature-adjusted air BSA through the bypass duct 4 is thereby stopped, whereby it is possible to avoid instances wherein heat is lost to the outdoor space SO by the heat exchange of the heat exchanger element 50a.

<Characteristics of Air-Conditioning Ventilator 1>

(1)

With the air-conditioning ventilator 1 of the embodiment described above, freezing of the ventilation unit 5 can be prevented by supplying the temperature-adjusted air BSA generated by the air-conditioning unit 6, even in cases in which the temperature of the air of the outdoor space SO is extremely low. It is also possible to avoid freezing of the air supply fan 52.

Therefore, damage caused by freezing of the ventilation unit 5 can be avoided while supplying fresh air to the indoor space SI without providing a heater or the like in the air supply duct 2, even in cases in which the temperature of the air of the outdoor space SO is extremely low.

(2)

With the air-conditioning ventilator 1 of the embodiment described above, since temperature-adjusted air BSA is mixed with outside air and supplied to the indoor space SI through the indoor air supply duct 22, local cooling by cold air blown out to the indoor space SI from the indoor air supply duct 22 can be resolved, and any discomfort felt by the user can be reduced.

<Modifications>

Embodiments of the present invention were described above with reference to the drawings, but the specific configuration is not limited to these embodiments; modifications can be made as described below as long as they do not deviate from the scope of the invention.

(A)

In the embodiment described above, an example was described of a case in which a bypass damper 41 was provided to the bypass duct 4 of the air-conditioning ventilator 1, and waste heat prevention control was performed by opening and closing this damper.

Figure 4:
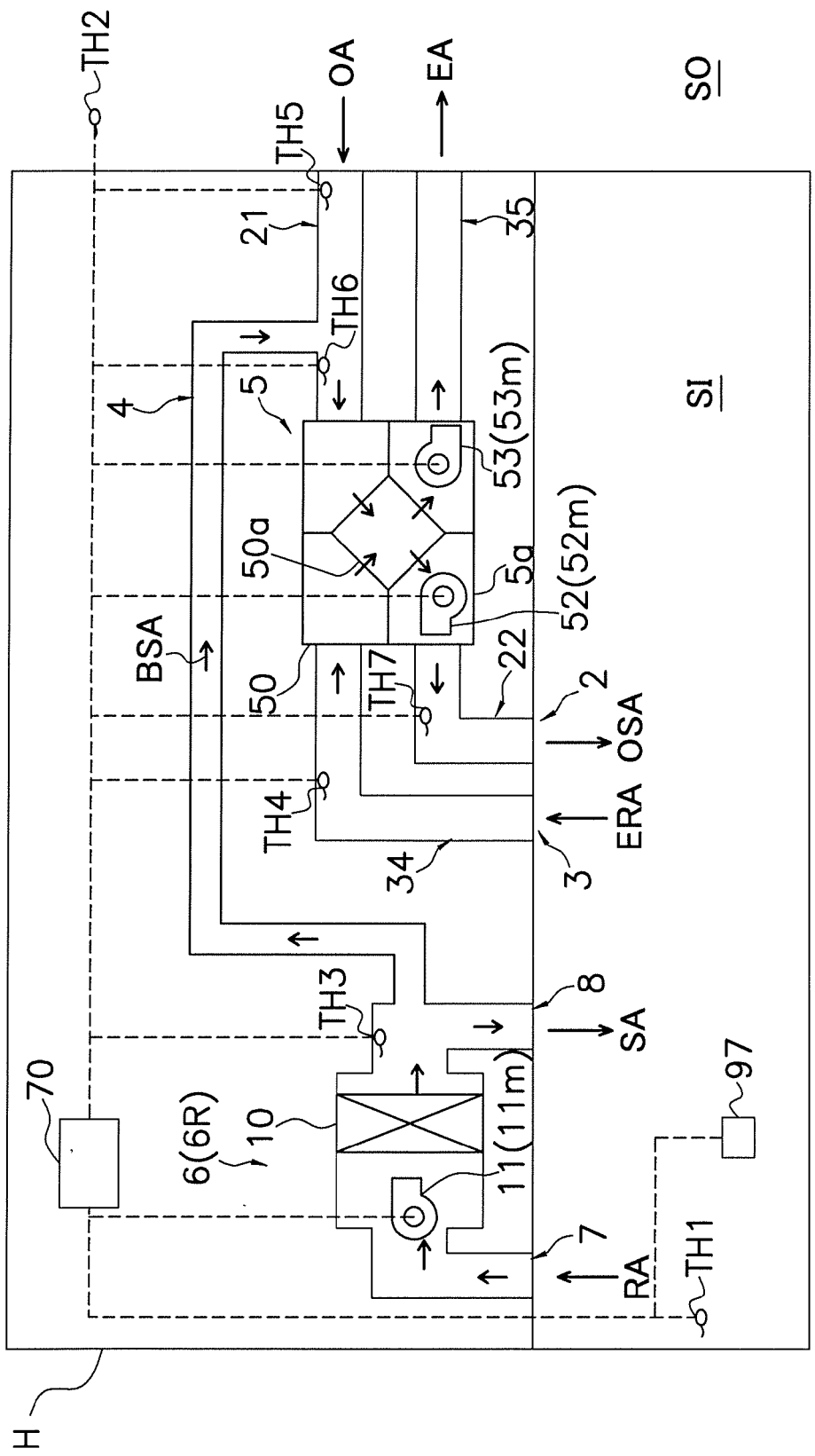
FIG. 4 is a drawing showing an air-conditioning ventilator according to Modification (A).

However, the present invention is not limited to this option alone, and a configuration having no bypass damper 41 may also be used as shown in FIG. 4, wherein the waste heat prevention control described above is implemented by, e.g., the control device 70 performing flow rate control such that the bypass duct 4 side has positive pressure with respect to the inlet duct 21; i.e., such that airflow from the inlet duct 21 to the bypass duct 4 is prevented.

The targets controlled by the control device 70 include the air supply fan 52 (the air supply fan motor 52*m*) and/or the indoor fan 11 (the indoor fan motor 11*m*), for example. Specifically, in order to create an airflow (a light draft) flowing to the inlet duct 21 from the bypass duct 4, for example, the rotational speed of the air supply fan motor 52*m* is increased and the airflow from the inlet duct 21 to the bypass duct 4 is prevented, or the rotational speed of the indoor fan motor 11*m* is increased and the airflow from the inlet duct 21 to the bypass duct 4 is prevented.

With the waste heat prevention control using this method, it is possible to avoid situations in which cold air flows through the bypass duct 4 from the ventilation unit 5 to the air-conditioning unit 6, and heat waste from the indoor space SI can be prevented.

The control device 70 may also perform a control for reducing the amount of temperature-adjusted air BSA supplied while keeping the bypass duct 4 at a positive pressure with respect to the inlet duct 21, in cases in which the difference between the temperature detected by the indoor temperature-humidity sensor TH1 and the temperature detected by the outdoor temperature-humidity sensor TH2 is less than a predetermined value. It is thereby possible to avoid instances wherein cold air flows through the bypass duct 4 from the ventilation unit 5 to the air-conditioning unit 6, while avoiding the loss of heat to the outdoor space SO due to the heat exchange of the heat exchanger element 50*a*.

(B)

For the various controls in the air-conditioning ventilator 1 of the embodiment described above, an example was described of a case in which the temperatures detected by the indoor temperature-humidity sensor TH1, the outdoor temperature-humidity sensor TH2, and other sensors were compared, and the amount of temperature-adjusted air BSA supplied was controlled.

However, the present invention is not limited to this option alone. For example, when controlling the amount of temperature-adjusted air BSA supplied, the control device 70 may perform flow rate control by comparing humidity values rather than temperature values. Furthermore, the control device 70 may perform flow rate control by comparing the temperature and humidity values detected by each of the sensors and by taking into account a discomfort index determined from the temperature and humidity values.

(C)

With the air-conditioning ventilator 1 of the embodiment described above, an example was described of a case in which the flow rate of temperature-adjusted air passing through the bypass duct 4 was adjusted by controlling the rotational speed of the air supply fan motor 52*m* or the rotational speed of the indoor fan motor 11*m*.

Figure 5:
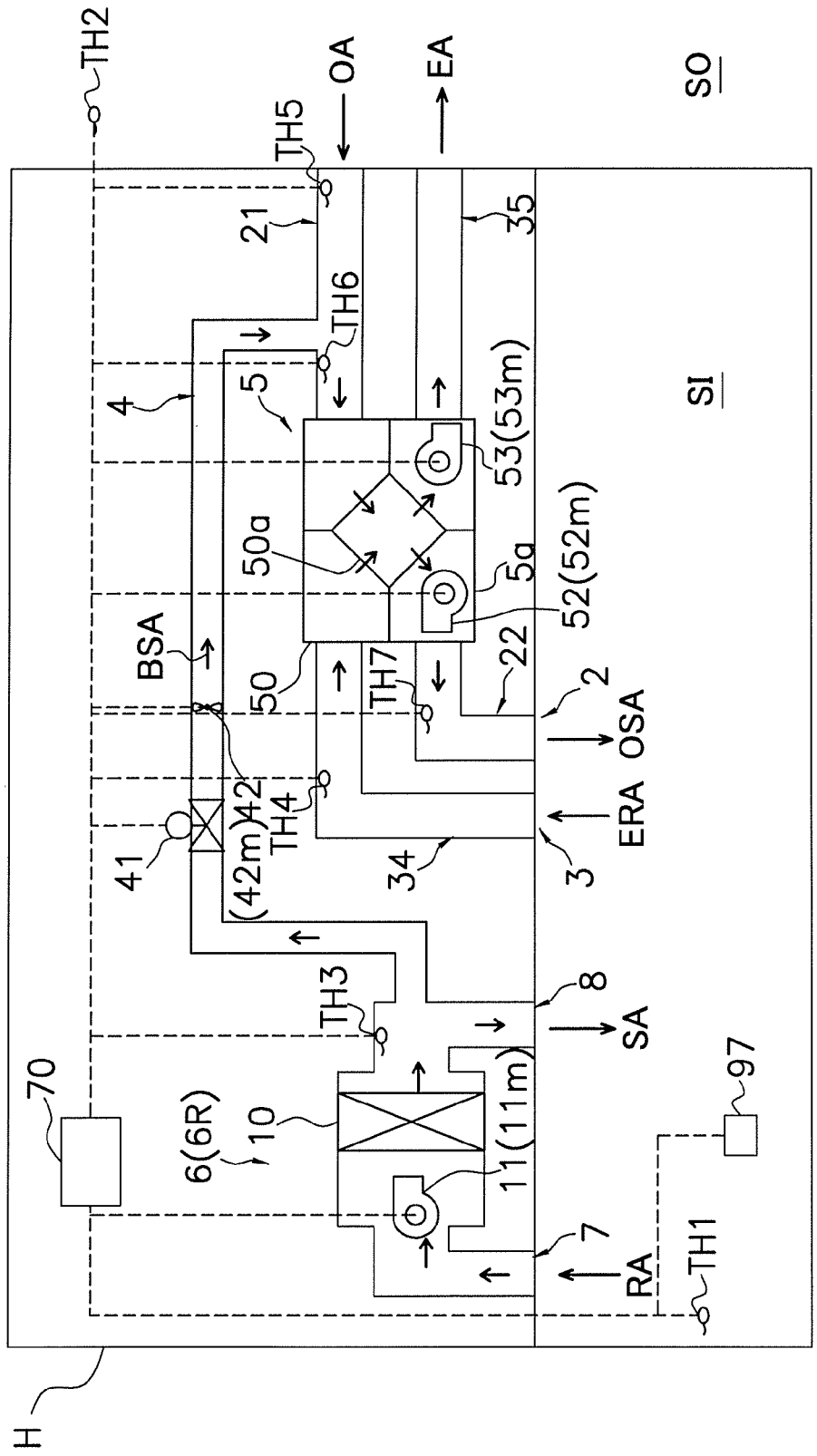
FIG. 5 is a drawing showing an air-conditioning ventilator according to Modification (C).

However, the present invention is not limited to this option alone, and another possible example is a configuration in which the midway of the bypass duct 4 is provided with a bypass fan 42 and a bypass fan motor 42*m* for creating an airflow flowing from the discharge duct 8 toward the inlet duct 21, as shown in FIG. 5. The bypass fan motor 42*m* is connected to the control device 70, and the rotational speed thereof is controlled. There is thereby no need to control the rotational speeds of both the indoor fan motor 11*m* and the air supply fan motor 52*m* in cases of performing adjustment control on the supplied amount of temperature-adjusted air BSA flowing through the bypass duct 4, and it is sufficient to control only the rotational speed of the bypass fan motor 42*m*.

(D)

An example of a configuration of mechanical ventilation was described as the ventilation unit 5 in the air-conditioning ventilator 1 of the embodiment described above, wherein a heat exchanger element 50*a* was installed, and air was forcefully supplied while also being forcefully discharged.

Figure 6:
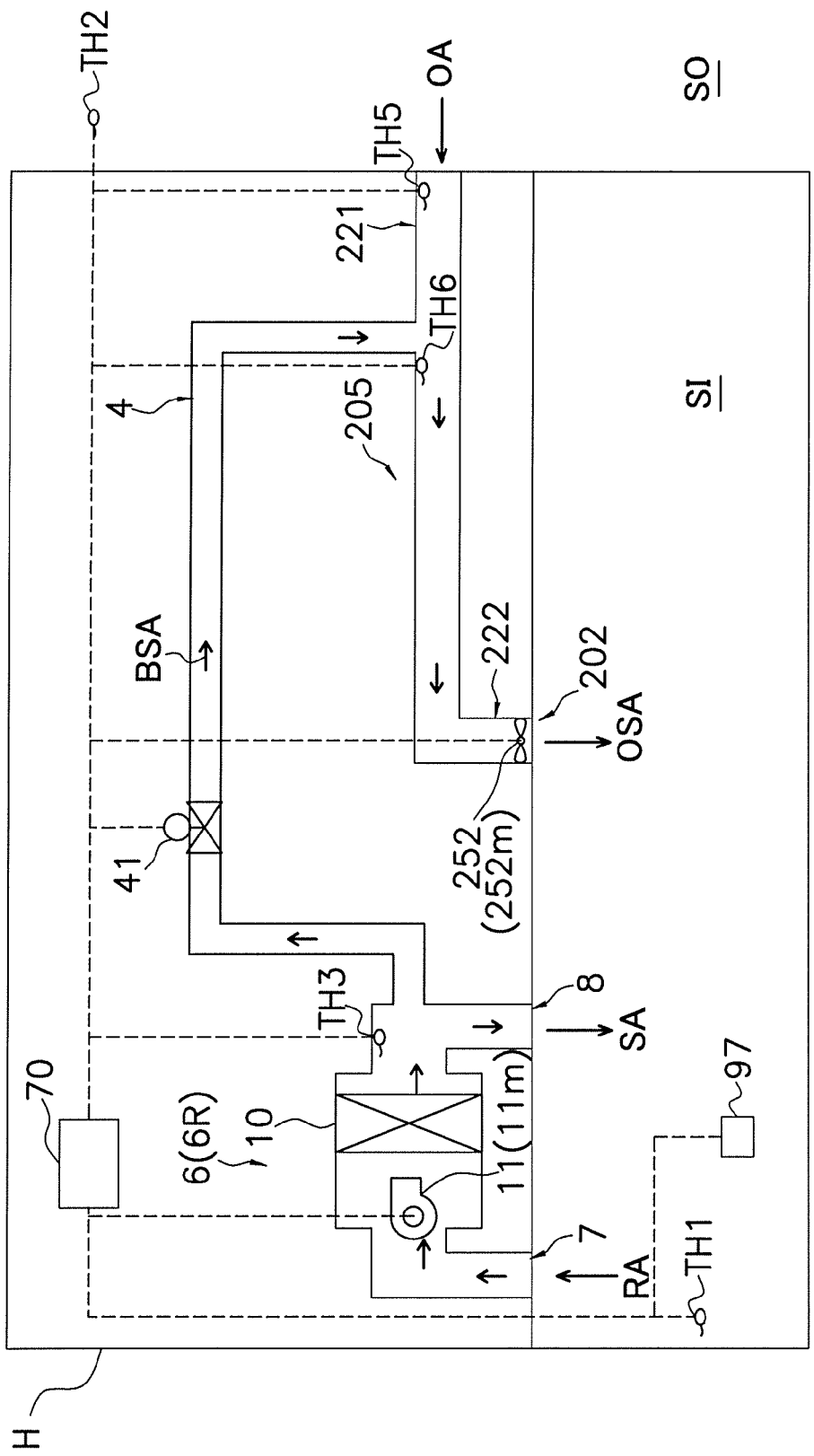
FIG. 6 is a drawing showing an air-conditioning ventilator according to Modification (D).

However, the present invention is not limited to this option alone, and another option is a configuration in which an air supply fan 205 is provided instead of the ventilation unit 5 of the embodiment described above, as shown in FIG. 6, for example. The bypass duct 4 of the embodiment described above may bypass part of the discharge duct 8 and part of an air supply duct 221 of the air supply fan 205.

(E)

With the air-conditioning ventilator 1 of the embodiment described above, an example was described of a case wherein a configuration was used in which the confluent air temperature-humidity sensor TH6 detected the temperature and humidity of the air passing nearer to the heat exchanger element 50*a* than the portion confluent with the bypass duct 4 in the inlet duct 21.

Figure 7:
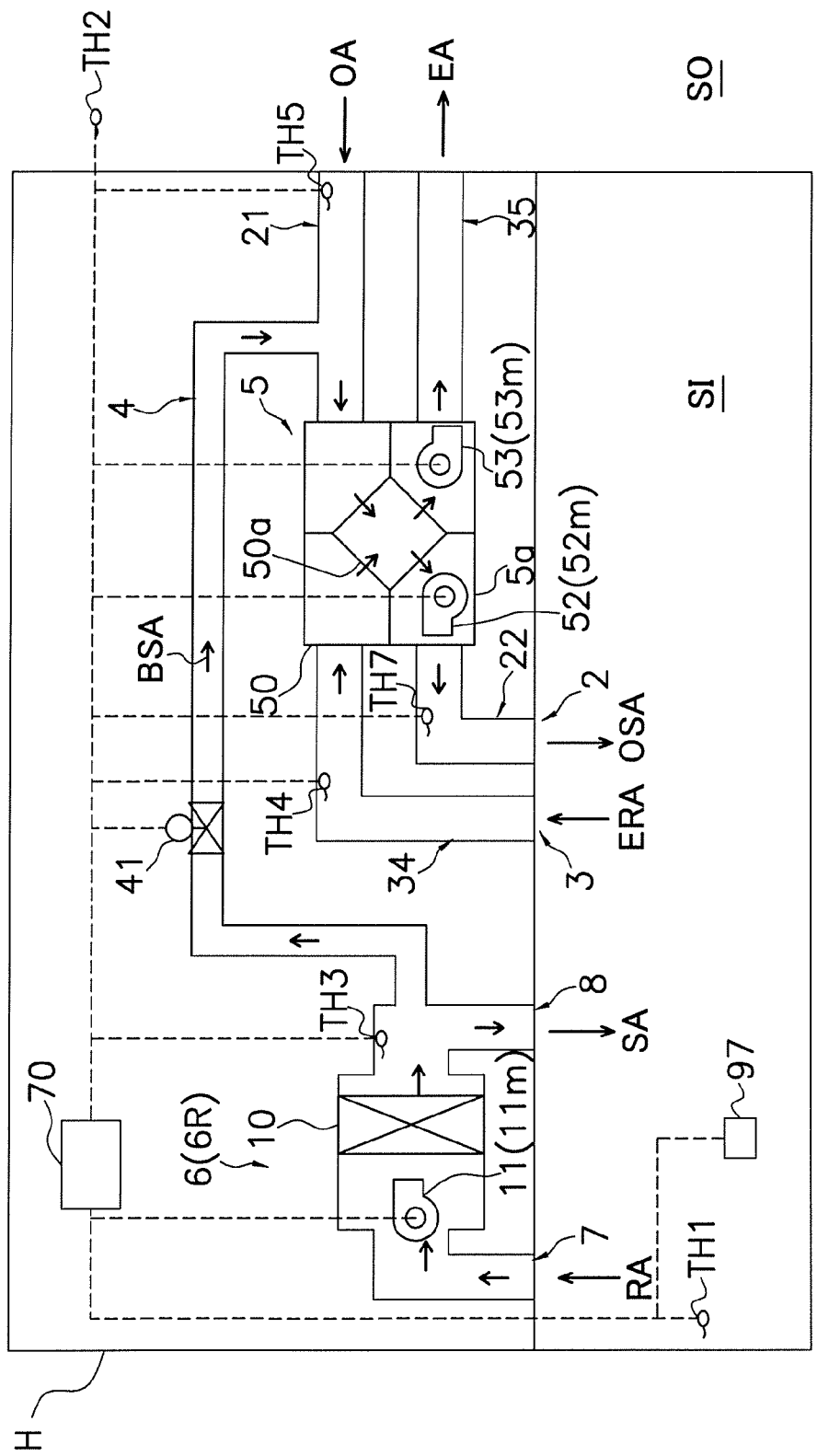
FIG. 7 is a drawing showing an air-conditioning ventilator according to Modification (E).

However, the present invention is not limited to this option alone, and another possible example is a configuration having no confluent air temperature-humidity sensor TH6 as shown in FIG. 7, wherein the value detected by the confluent air temperature-humidity sensor TH6 in the embodiment described above is obtained by the control device 70 calculating an estimated value derived from the temperature-adjusted air temperature-humidity sensor TH3, the outside air intake temperature-humidity sensor TH5, and the rotational speed of the air supply fan motor 52*m* of the air supply fan 52.

In the configuration according to Modification (C), the control device 70 may obtain the value by calculating an estimated value derived from the temperature-adjusted air temperature-humidity sensor TH3, the outside air intake temperature-humidity sensor TH5, the rotational speed of the air supply fan motor 52m of the air supply fan 52, and the rotational speed of the bypass fan motor 42m of the bypass fan 42.

(F)

With the air-conditioning ventilator 1 of the embodiment described above, an example was described of a configuration in which the temperature and humidity of the air passing through the indoor air supply duct 22 were detected by the indoor discharge temperature-humidity sensor TH7.

However, the present invention is not limited to this option alone, and another possible option is that, e.g., the control device 70 performs a control for adjusting the air quality of the indoor discharged air such that the temperature or humidity detected by the indoor discharge temperature-humidity sensor TH7 and their correlation value approach the temperature or humidity detected by the indoor temperature-humidity sensor TH1 and their correlation value. It is thereby possible to further reduce any discomfort from localized cold air or the like caused by outside fresh air being taken into the indoor space.

Specifically, the control device 70 can perform a control for adjusting the air quality of the inside discharged air by adjusting the degree of opening of the bypass damper 41, by adjusting the rotational speed of the air supply fan motor 52m of the air supply fan 52, by further adjusting the rotational speed of the bypass fan motor 42m of the bypass fan 42 in the configuration described in Modification (C), or by a combination of any of these adjustments.

(G)

With the air-conditioning ventilator 1 of the embodiment described above, an example was described of a case in which the temperature of the confluent air in the inlet duct 21 was adjusted by adjusting the degree of opening of the bypass damper 41, as an example of waste heat prevention control.

Figure 8:
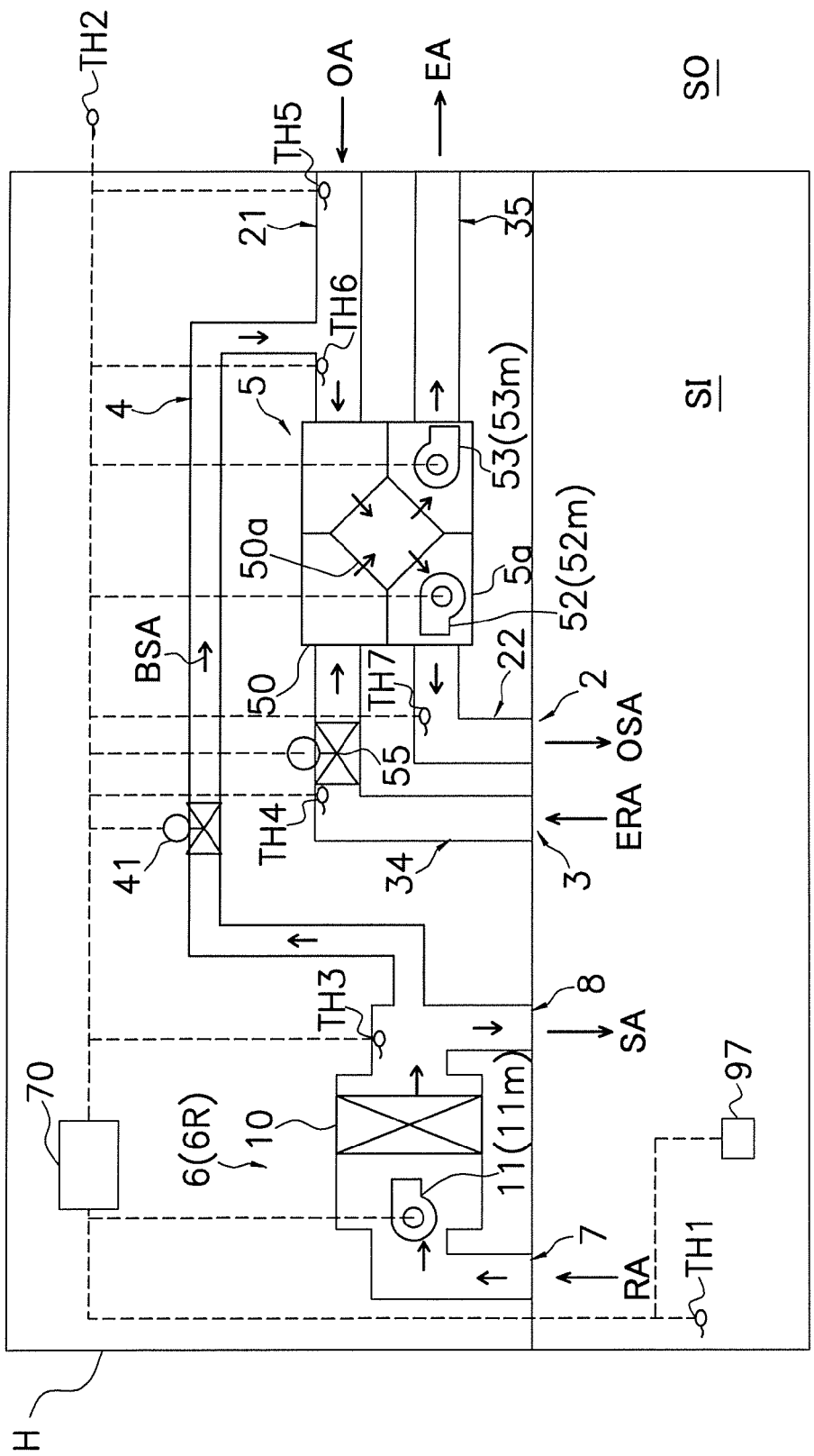
FIG. 8 is a drawing showing an air-conditioning ventilator according to Modification (G).

However, the present invention is not limited to this option alone, and another possible option, for example, is waste heat prevention control to be implemented by adjusting the degree of opening of an air discharge damper 55 in a configuration provided with the air discharge damper 55 as shown in FIG. 8. The air discharge damper 55 herein is provided in the air discharge duct 3 so as to be positioned between the indoor space SI and the heat exchanger element 50a. The control device 70 performs waste heat prevention control for closing the air discharge damper 55 in cases in which the difference between the inside temperature detected by the air discharge temperature-humidity sensor TH4 and the temperature detected by the confluent air temperature-humidity sensor TH6 is less than a predetermined value; i.e., in cases in which the confluent air temperature detected by the confluent air temperature-humidity sensor TH6 is higher than the inside temperature detected by the air discharge temperature-humidity sensor TH4.

By performing this waste heat prevention control, it is possible to avoid instances wherein heat is wasted along with the discharge of air from the indoor space SI. Specifically, in cases in which the difference between the inside temperature and the outside temperature is less than a predetermined value, the confluent air containing the temperature-adjusted air BSA that has passed through the bypass duct 4 and the air of the outdoor space SO that has passed through the inlet duct 21 is sometimes higher in temperature than the inside air being discharged from the indoor space SI through the air discharge duct 3. When the air discharge damper 55 is opened and heat exchange is conducted between the air passing through the air discharge duct 3 from the indoor space SI and the confluent air containing the temperature-adjusted air BSA that has passed through the bypass duct 4 and the outside air that has passed through the inlet duct 21 even in such a case, the air being discharged to the outdoor space SO takes heat from the air being supplied to the indoor space SI, and heat is wasted.

The occurrence of such situations can be prevented by performing a control for closing the air discharge damper 55 during waste heat prevention control. The discharge of air through the air discharge duct 3 is thereby stopped, whereby it is possible to avoid instances wherein heat is lost to the outdoor space SO by the heat exchange of the heat exchanger element 50a.

(H)

With the air-conditioning ventilator 1 of the embodiment described above, an example was described of a case in which the temperature of the confluent air in the air supply channel 21 was adjusted by adjusting the degree of opening of the bypass damper 41, as an example of waste heat prevention control.

Figure 9:
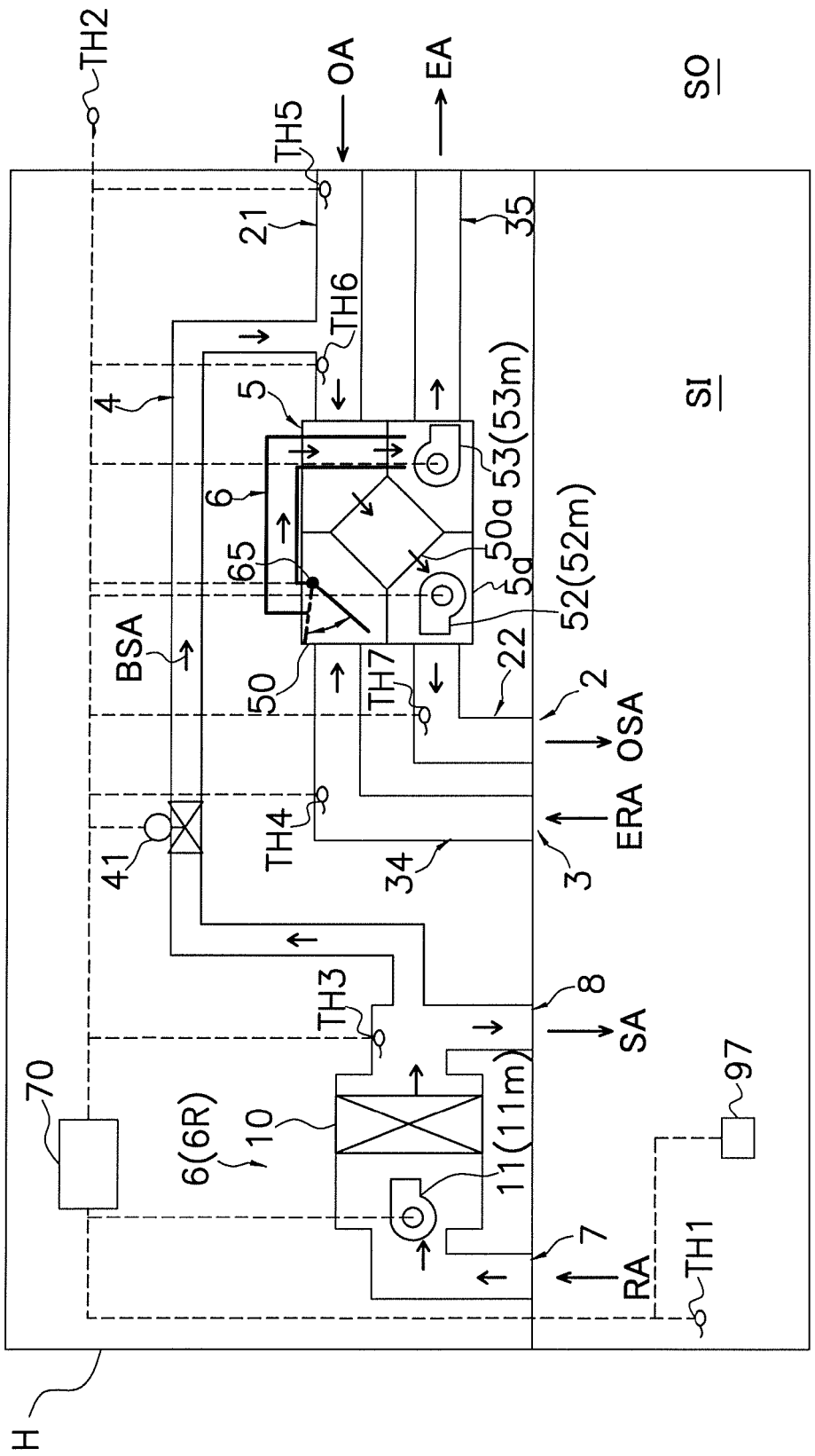
FIG. 9 is a drawing showing an air-conditioning ventilator according to Modification (H).

However, the present invention is not limited to this option alone, and another possible option, for example, is waste heat prevention control to be implemented by adjusting the degree of opening of a branching air discharge damper 65 in a configuration provided with a branching air discharge channel 6 and the branching air discharge damper 65 as shown in FIG. 9. The branching air discharge damper 65 herein is provided in the upstream-side inlet of the branching air discharge channel 6 so as to make it possible to switch between a state wherein the indoor air discharge duct 34 and the branching air discharge channel 6 are connected and discharged air does not pass through the heat exchanger element 50a, and a state wherein the indoor air discharge duct 34 and the branching air discharge channel 6 are not connected and discharged air does pass through the heat exchanger element 50a. The control device 70 performs waste heat prevention control for opening the branching air discharge damper 65 in cases in which the difference between the indoor temperature detected by the air discharge temperature-humidity sensor TH4 and the temperature detected by the confluent air temperature-humidity sensor TH6 is less than a predetermined value; i.e., in cases in which the confluent air temperature detected by the confluent air temperature-humidity sensor TH6 is higher than the indoor temperature detected by the air discharge temperature-humidity sensor TH4.

By performing this waste heat prevention control, it is possible to avoid instances wherein heat is wasted along with the discharge of air from the indoor space SI. Specifically, in cases in which the difference between the indoor temperature and the outside temperature is less than a predetermined value, the confluent air containing the temperature-adjusted air BSA that has passed through the bypass duct 4 and the air of the outdoor space SO that has passed through the inlet duct 21 is sometimes higher in temperature than the indoor air being discharged from the indoor space SI through the air discharge duct 3. When the branching air discharge damper 65 is closed and heat exchange is conducted between the air passing through the air discharge duct 3 from the indoor space SI and the confluent air containing the temperature-adjusted air BSA that has passed through the bypass duct 4 and the outside air that has passed through the inlet duct 21 even in such a case, the air being discharged to the outdoor space SO takes heat from the air being supplied to the indoor space SI, and heat is wasted.

The occurrence of such situations can be prevented by performing a control for opening the branching air discharge damper 65 during waste heat prevention control. It is thereby possible to avoid instances wherein heat is lost to the outdoor space SO by the heat exchange of the heat exchanger element 50*a*, while performing ventilation via the branching air discharge channel 6.

INDUSTRIAL APPLICABILITY

If the present invention is used, freezing of the ventilation unit due to a supply of cold air can be suppressed while ensuring the supply of fresh air through ventilation, and the present invention is therefore particularly useful when applied to an air-conditioning ventilator for performing air conditioning while ventilating an indoor space in a cold region.

What is claimed is:

1. An air-conditioning ventilator for performing air conditioning and ventilation in a target space, the air conditioning Ventilator comprising:
   a ventilation unit including
      an air supply channel configured to supply air from an outdoor space to the target space,
      an air supply fan configured to create a first airflow from the outdoor space to the target space within the air supply channel,
      an air exhaust channel configured to discharge air in the target space to the outdoor space,
      an air discharge fan configured to create a third airflow from the target space to the outdoor space in the air exhaust channel, and
      a heat exchanging unit configured to conduct heat exchange while suppressing mixing between the first airflow in the air supply channel and the third airflow in the air exhaust channel;
   an air-conditioning unit including
      an intake channel configured to take in air from the target space,
      a temperature regulator configured to regulate the temperature of air that has passed through the intake channel,
      a discharge channel configured to discharge temperature-adjusted air that has been regulated by the temperature regulator to the target space, and
      an air-conditioning fan configured to create a second airflow from the intake channel to the discharge channel via the temperature regulator;
   a bypass channel bypassing the discharge channel and connecting to a part of the air supply channel between the outdoor space and the heat exchanging unit, an airflow path being formed from the outdoor space through the heat exchanging unit to the target space and from the target space through the air-conditioning unit and through the bypass channel to the air supply channel,
   the bypass channel being configured to create an airflow of the temperature-adjusted air from the discharge channel to the air supply channel between the outdoor space and the heat exchanging unit; the bypass channel has a bypass damper with a passage surface area that can be varied, and
   a confluent air temperature detector configured to detect temperature in the air supply channel between a confluence portion associated with the bypass channel and the heat exchanging unit—a discharged air temperature detector configured to detect temperature in the air discharge channel between the target space and the heat exchanging unit; and a shutoff controller configured to close the bypass damper when a difference between the temperature detected by the discharged air temperature detector and the temperature detected by the confluent air temperature detector is less than a predetermined value.

2. The air-conditioning ventilator according to claim 1, wherein
   the bypass channel has a bypass damper with a passage surface area that can be varied.

3. The air-conditioning ventilator according to claim 1, wherein
   the bypass channel has a bypass damper with a passage surface area that can be varied; and the air-conditioning ventilator further comprises
   a target temperature detector configured to detect temperature of the target space;
   an outdoor temperature detector configured to detect temperature of the outdoor space; and
   an opening closing controller configured to close the bypass damper when a difference between the temperature detected by the target temperature detector and the temperature detected by the outdoor temperature detector is less than a predetermined value.

4. The air-conditioning ventilator according to claim 1, further comprising:
   an air discharge damper with a passage surface area that can be varied, the air discharge damper being provided in the air discharge channel; and
   an air discharge damper shutoff controller configured to close the air discharge damper when a difference between the temperature detected by the discharged air temperature detector and the temperature detected by the confluent air temperature detector is less than a predetermined value.

5. The air-conditioning ventilator according to claim 4, wherein
   the air discharge damper is provided in the air discharge channel between the target space and the heat exchanging unit.

6. The air-conditioning ventilator according to claim 1, further comprising:
   a branching air discharge channel configured to connect upstream and downstream sides of the heat exchanging unit so as not to pass through the heat exchanging unit;
   a branching air discharge damper with a passage surface area that can be varied, the branching air discharge damper being provided in the branching air discharge channel; and
   a branching air discharge damper opening controller configured to open the branching air discharge damper when a difference between the temperature detected by the discharged air temperature detector and the temperature detected by the confluent air temperature detector is less than a predetermined value.

7. The air-conditioning ventilator according to claim 6, wherein
   the branching air discharge damper is configured to switch between
      a first state in which the air discharge channel and the heat exchanging unit are connected, and
      a second state in which the air discharge channel and the branching air discharge channel are connected.

8. The air-conditioning ventilator according to claim 1, further comprising:
   a positive pressure controller configured to perform an airflow rate control operation such that a bypass channel side has positive pressure with respect to the air supply channel.

9. The air-conditioning ventilator according to claim 1, further comprising:
a target temperature detector configured to detect temperature of the target space;
an outdoor temperature detector configured to detect temperature of the outdoor space; and
an airflow rate reduction controller configured to perform a control operation in order to reduce an air supply rate while ensuring that the bypass channel has positive pressure with respect to the air supply channel when a difference between the temperature detected by the target temperature detector and the temperature detected by the outdoor temperature detector is less than a predetermined value.

10. The air-conditioning ventilator according to claim 1, further comprising: and
an airflow rate adjustment controller configured to perform a control operation in order to reduce an air supply rate while ensuring that the bypass channel has positive pressure with respect to the air supply channel when a difference between the temperature detected by the discharged air temperature detector and the temperature detected by the confluent air temperature detector is less than a predetermined value.

11. The air-conditioning ventilator according to claim 1, further comprising:
an air supply detector configured to detect startup of the air supply fan; and
a startup controller configured to increase an amount of air flowing from the bypass channel to the air supply channel when the air supply detector has detected startup of the air supply fan.

12. The air-conditioning ventilator according to claim 1, further comprising:
an air supply detector configured to detect a predetermined operating state of the air supply fan; and
an operation positive pressure controller configured to perform a control operation such that an airflow rate of the air supply fan is greater than an airflow rate of the air discharge fan when the air supply detector has detected the predetermined operating state of the air supply fan.

13. The air-conditioning ventilator according to claim 1, further comprising:
an airflow rate controller configured to control a flow rate of supplied air passing through the bypass channel from the air-conditioning unit toward the ventilation unit.

14. The air-conditioning ventilator according to claim 13, further comprising:
an outdoor sensor configured to detect outdoor information, the outdoor sensor including at least one of
an outdoor temperature detector configured to detect temperature of the outdoor space as the outdoor information, and
an outdoor humidity detector configured to detect humidity of the outdoor space as the outdoor information; and wherein
the airflow rate controller is further configured to control the flow rate of the supplied air in accordance with the outdoor information detected by the outdoor sensor.

15. The air-conditioning ventilator according to claim 14, further comprising:
an indoor sensor configured to detect indoor information, the indoor sensor including at least one of
an indoor temperature detector configured to detect temperature of the indoor space as the indoor information, and
an indoor humidity detector configured to detect the humidity of the indoor space as the indoor information; and wherein
the airflow rate controller is further configured to control the flow rate of the supplied air in accordance with a relationship between the outdoor information detected by the outdoor sensor and the indoor information detected by the indoor sensor.

16. The air-conditioning ventilator according to claim 13, further comprising:
an air supply port sensor configured to detect air supply port information, the air supply port sensor including at least one of
an air supply port temperature detector configured to detect temperature in the air supply channel between the outdoor space and a confluence portion associated with the bypass channel as the air supply port information, and
an air supply port humidity detector configured to detect humidity in the air supply channel between the outdoor space and the confluence portion associated with the bypass channel as the air supply port information; and wherein
the airflow rate controller is further configured to control the flow rate of the supplied air in accordance with the air supply port information detected by the air supply port sensor.

17. The air-conditioning ventilator according to claim 16, further comprising:
an outdoor sensor configured to detect outdoor information, the outdoor sensor including at least one of
an outdoor temperature detector configured to detect outdoor temperature as the outdoor information, and
an outdoor humidity detector configured to detect outdoor humidity as the outdoor information; and wherein
the airflow rate controller is further configured to control the flow rate of the supplied air in accordance with a relationship between the air supply port information detected by the air supply port sensor and the outdoor information detected by the outdoor sensor.

18. The air-conditioning ventilator according to claim 13, further comprising:
a confluence sensor configured to detect confluence information, the confluence sensor including at least one of
the confluent air temperature detector configured to detect temperature in the air supply channel between the confluence portion associated with the bypass channel and the heat exchanging unit as the confluence information, and
a confluence humidity detector configured to detect humidity in the air supply channel between the confluence portion associated with the bypass channel and the heat exchanging unit as the confluence information; and wherein
the airflow rate controller is further configured to control the flow rate of the supplied air in accordance with the confluence information detected by the confluence sensor.

19. The air-conditioning ventilator according to claim 18, further comprising:
an air supply port sensor configured to detect air supply port information, the air supply port sensor including at least one of
an air supply port temperature detector configured to detect temperature in the air supply channel between the outdoor space and the confluence portion associated with the bypass channel as the air supply port information, and an air supply port humidity detector configured to detect humidity in the air supply channel between the outdoor space and the confluence portion associated with the bypass channel as the air supply port information; and wherein the airflow rate controller is further configured to control the flow rate of the supplied air in accordance with a relationship between the confluence information detected by the confluence sensor and the air supply port information detected by the air supply port sensor.

20. The air-conditioning ventilator according to claim 1, wherein the air supply fan has an air supply fan motor configured to adjust an airflow rate of the first airflow by varying rotational speed of the of the air supply fan motor; and the air-conditioning ventilator further comprises an air supply port sensor configured to detect air supply port information, the air supply port sensor including at least one of an air supply port temperature detector configured to detect temperature in the air supply channel between the outdoor space and a confluence portion associated with the bypass channel as the air supply port information, and an air supply port humidity detector configured to detect humidity in the air supply channel between the outdoor space and the confluence portion associated with the bypass channel as the air supply port information;

a discharge channel sensor configured to detect discharge channel information, the discharge channel sensor including at least one of a discharge channel temperature detector configured to detect temperature of air passing through the discharge channel as the discharge channel information, and a discharge channel humidity detector configured to detect humidity of air passing through the discharge channel as the discharge channel information; and a confluence calculator configured to calculate either temperature or humidity of air passing through a point of confluence between the air supply channel and the bypass channel based on the air supply port information, the discharge channel information, and the rotational speed of the air supply fan motor.

21. The air-conditioning ventilator according o claim 1, wherein the bypass channel has a bypass damper with a surface area that can be varied, and a bypass fan with a passage airflow rate that can be varied by varying rotational speed of a bypass fan motor;

the air supply fan has an air supply fan motor configured to vary a passage airflow rate of the first airflow in the air supply channel by varying rotational speed of the of the air supply fan motor; and the air-conditioning ventilator further comprises a setting receiver configured to receive input information for at least one of a set temperature and a set humidity in the target space;

an indoor discharge sensor configured to detect indoor discharge information, the indoor discharge sensor including at least one of an indoor discharge temperature detector configured to detect temperature of air passing through a discharge space in the air supply channel between the heat exchanging unit and the target space as the indoor discharge information, and an indoor discharge humidity detector configured to detect humidity of air passing through the discharge space as the indoor discharge information; and a discharge controller configured to adjust at least one of the degree of opening of the bypass damper, the rotational speed of the bypass fan motor, and the rotational speed of the air supply fan motor such that the indoor discharge information detected by the indoor discharge sensor approaches the input information received by the setting receiver.

\* \* \* \* \*